（12）United States Patent
Xiang et al.

(10) Patent No.: US 11,057,635 B2
(45) Date of Patent: Jul. 6, 2021

(54) METHODS AND SYSTEMS FOR VIDEO SYNOPSIS

(71) Applicant: ZHEJIANG DAHUA TECHNOLOGY CO., LTD., Zhejiang (CN)

(72) Inventors: Jianhua Xiang, Hangzhou (CN); Wenkai Zhou, Hangzhou (CN); Yan Xu, Hangzhou (CN); Lili Chen, Hangzhou (CN); Li Yang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 18 days.

(21) Appl. No.: 16/434,305

(22) Filed: Jun. 7, 2019

(65) Prior Publication Data
US 2019/0289311 A1    Sep. 19, 2019

Related U.S. Application Data

(63) Continuation of application No. PCT/CN2016/109015, filed on Dec. 8, 2016.

(51) Int. Cl.
*H04N 7/18* (2006.01)
*H04N 19/46* (2014.01)
(Continued)

(52) U.S. Cl.
CPC ......... *H04N 19/46* (2014.11); *G06K 9/00751* (2013.01); *G06K 9/00765* (2013.01);
(Continued)

(58) Field of Classification Search
None
See application file for complete search history.

(56) References Cited

U.S. PATENT DOCUMENTS

| 6,986,158 B1 | 1/2006 | Terui et al. |
| 7,313,808 B1 | 12/2007 | Gupta et al. |
| | (Continued) | |

FOREIGN PATENT DOCUMENTS

| CN | 103200204 A | 7/2013 |
| CN | 104239501 A | 12/2014 |
| | (Continued) | |

OTHER PUBLICATIONS

International Search Report in PCT/CN2016/109015 dated Aug. 23, 2017, 4 pages.
(Continued)

*Primary Examiner* — Eileen M Adams
(74) *Attorney, Agent, or Firm* — Metis IP LLC

(57) ABSTRACT

A method for generating a video synopsis may include: segmenting a video file into a plurality of video fragments. The method may also include extracting moving object information from the video fragment based on a distributed computing method and determining a plurality of index files based on the moving object information. The method may further include combining the plurality of index files and generating a video synopsis based on the moving object information and the combined index file.

18 Claims, 17 Drawing Sheets

(51) Int. Cl.
*H04N 19/40* (2014.01)
*G06K 9/00* (2006.01)
*G06T 7/20* (2017.01)
*H04N 21/44* (2011.01)
*H04N 21/8549* (2011.01)
*H04N 21/234* (2011.01)
*H04N 21/845* (2011.01)

(52) U.S. Cl.
CPC ............... *G06T 7/20* (2013.01); *H04N 7/18* (2013.01); *H04N 19/40* (2014.11); *H04N 21/23418* (2013.01); *H04N 21/44008* (2013.01); *H04N 21/8456* (2013.01); *H04N 21/8549* (2013.01); *G06T 2207/10016* (2013.01); *G06T 2207/30232* (2013.01); *G06T 2207/30241* (2013.01)

(56) References Cited

U.S. PATENT DOCUMENTS

| | | | |
|---|---|---|---|
| 9,313,556 | B1 | 4/2016 | Borel et al. |
| 9,501,915 | B1 | 11/2016 | Laska et al. |
| 2004/0207656 | A1* | 10/2004 | Lee ............ G06K 9/3241 715/723 |
| 2005/0005308 | A1 | 1/2005 | Logan et al. |
| 2009/0313484 | A1* | 12/2009 | Millet ............ G06F 1/30 713/300 |
| 2009/0323809 | A1* | 12/2009 | Raveendran ...... H04N 19/107 375/240.16 |
| 2013/0198358 | A1* | 8/2013 | Taylor ............ H04L 41/0213 709/223 |
| 2013/0208984 | A1 | 8/2013 | Mase |
| 2014/0214885 | A1 | 7/2014 | Park et al. |
| 2015/0143239 | A1 | 5/2015 | Birkbeck et al. |
| 2016/0241486 | A1 | 8/2016 | Jiao |
| 2016/0323658 | A1 | 11/2016 | Richardson |
| 2017/0013230 | A1 | 1/2017 | Hirakawa |

FOREIGN PATENT DOCUMENTS

| | | |
|---|---|---|
| CN | 105451020 A | 3/2016 |
| CN | 105491329 A | 4/2016 |
| EP | 2819418 A1 | 12/2014 |
| EP | 2884423 A2 | 6/2015 |
| EP | 2891990 A1 | 7/2015 |
| WO | 2007057893 A2 | 5/2007 |

OTHER PUBLICATIONS

Written Opinion in PCT/CN2016/109015 dated Aug. 23, 2017, 5 pages.

The Extended European Search Report in European Application No. 16923286.5 dated Jul. 29, 2019, 11 pages.

Ling Xu et al., Optimization Method for Trajectory Combination in Surveillance Video Synopsis Based on Genetic Algorithm, Journal of Ambient Intelligence and Humanized Computing, 6(5): 623-633, 2015.

Debi Prosad Dogra et al., Smart Video Summarization Using Mealy Machine-based Trajectory Modelling for Surveillance Applications, Multimedia Tools and Applications, 75(11): 6373-6401, 2016.

Markus Hoferlin et al., Interactive Schematic Summaries for Faceted Exploration of Surveillance Video, IEEE Transactions on Multimedia, 15(4): 908-920, 2013.

Bilge Gunsel et al., Content-based Access to Video Objects: Temporal Segmentation, Visual Summarization, and Feature Extraction, Signal Processing, 66: 261-280, 1998.

Amir H. Meghdadi et al., Interactive Exploration of Surveillance Video through Action Shot Summarization and Trajectory Visualization, IEEE Transactions on Visualization and Computer Graphics, 19(12): 2119-2128, 2013.

Maia Zaharieva et al., Recurring Element Detection in Movies, International Conference on Computer Analysis of Images and Patterns, 7131: 222-232, 2012.

Maguelonne Heritier et al., Places Clustering of Full-Length Film Key-Frames Using Latent Aspect Modeling Over SIFT Matches, IEEE Transactions on Circuits and Systems for Video Technology, 19(6): 832-841, 2009.

* cited by examiner

 
FIG. 17-A                    FIG. 17-B

FIG. 18-A
FIG. 18-B
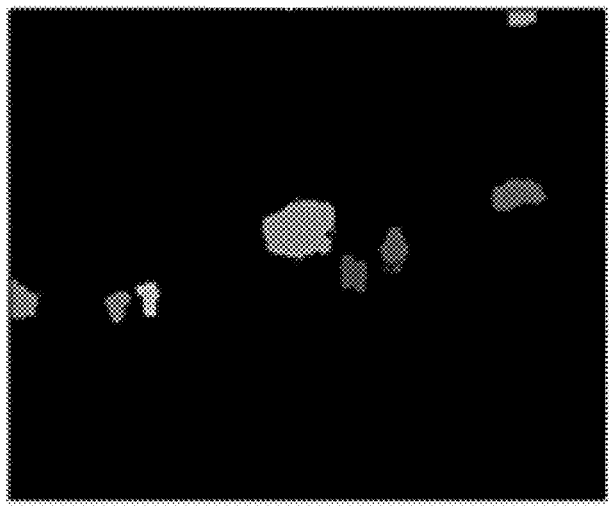
FIG. 18-C

METHODS AND SYSTEMS FOR VIDEO SYNOPSIS

CROSS-REFERENCE TO RELATED APPLICATIONS

This application is a continuation of International Application No. PCT/CN2016/109015, filed on Dec. 8, 2016, which designates the United States of America, the contents of which are incorporated herein by reference in their entirety.

TECHNICAL FIELD

The present disclosure generally relates to video processing, and more specifically relates to methods and systems for generating a video synopsis.

BACKGROUND

Video surveillance plays an important role in a security system. Video surveillance can be used in crime prevention, industrial process, traffic monitoring, transport safety, control of retail, etc. Generally the time duration of a video captured during the video surveillance is too long to identify multiple moving objects from the video efficiently. It is desirable to provide systems and methods for generating a video summary, which may be used to identify the multiple moving objects efficiently and accurately.

SUMMARY

One aspect of the present disclosure is directed to a method for generating a video synopsis. The method may include one or more of the following operations. A video file may be segmented into a plurality of video fragments. Moving object information may be extracted from the video fragment based on a distributed computing method. A plurality of index files may be determined based on the moving object information. The plurality of index files may be combined. A video synopsis may be generated based on the moving object information and the combined index file.

Another aspect of the present disclosure is directed to a system for generating a video synopsis. The system includes a memory storing instructions and at least one processor configured to execute the instructions. The processor may segment a video file into a plurality of video fragments. The processor may extract moving object information from the video fragment based on a distributed computing method. The processor may determine a plurality of index files based on the moving object information. The processor may combine the plurality of index files. The processor may generate a video synopsis based on the moving object information and the combined index file.

Yet another aspect of the present disclosure is directed to a non-transitory computer readable medium embodying a computer program product, the computer program product including instructions configured to cause a computing device to segment a video file into a plurality of video fragments; extract moving object information from the video fragment based on a distributed computing method; determine a plurality of index files based on the moving object information; combine the plurality of index files; and generate a video synopsis based on the moving object information and the combined index file.

In some embodiments, a parameter of the video file may be analyzed. A computing power may be determined. A parameter of a video segment may be determined based on the parameter of video file and the computer power. The plurality of video fragments may be generated based on the parameter of the video file and the parameter of the video segment.

In some embodiments, the parameter of the video file may include a type of a frame, a length of the frame, a location of the frame, the number of the frames in the video file, a frame index of the video file, or size of the video file.

In some embodiments, a first frame number may be determined. A first computing power may be determined. A second frame number may be determined based on the parameter of the video file and the first computing power. A third frame number may be determined based on the first frame number and the second frame number. The plurality of video fragments may be generated based on the parameter of the video file and the third frame number.

In some embodiments, a size of the video file may be obtained. A predetermined size of the video segment may be obtained. A first segment number may be determined based on the size of the video file and the predetermined size of the video segment. A second computing power may be determined. A second segment number may be determined based on the first segment number and the second computing power. A size of the video segment may be determined based on the size of the video file and the second segment number. The plurality of video fragments may be generated based on the size of the video segment and the second segment number.

In some embodiments, bit stream of the video file may be analyzed. A first start of frame (SOF) and video data may be determined based on the bit stream. A second SOF may be determined based on the first SOF. A transcoded video file may be determined based on the second SOF and the video data.

In some embodiments, the data of the video fragment may be decoded. A moving object may be detected based on the decoded video fragment. The moving object information may be extracted based on the moving object from the decoded video fragment.

In some embodiments, a moving object information file may be generated based on the moving object information. An index file may be generated based on the moving object information file.

In some embodiments, a first moving path sequence may be obtained for a first section in a first video fragment. A second moving path sequence may be obtained for a second section in a second video fragment. The first moving path sequence and the second moving path sequence may be compared. A duplicate moving object of the first video fragment and the second video fragment may be determined.

In some embodiments, the index files of the plurality of video fragments may be combined. The moving object information may be arranged based on the combined index file. Video data of a plurality of frames may be generated based on the arranged moving object information. The video data may be encoded into a video synopsis.

Yet another aspect of the present disclosure is directed to a system including a video segmentation module, a video information extraction module, a video combination module, and a video synopsis module. The video segmentation module may be configured to segment a video file into a plurality of video fragments. The video information extraction module may be configured to extract moving object information from the video fragment based on a distributed computing method and determine a plurality of index files based on the moving object information. The video combination module may be configured to combine the plurality of index files. The video synopsis module may be configured to generate a video synopsis based on the moving object information and the combined index file.

In some embodiments, the video segmentation module may further include a video file analysis unit, a computing power determination unit, a video segment determination unit, and a video fragment generation unit. The video file analysis unit may be configured to analyze a parameter of the video file. The computing power determination unit may be configured to determine a computing power. The video segment determination unit may be configured to determine a parameter of a video segment based on the parameter of video file and the computer power. The video fragment generation unit may be configured to generate the plurality of video fragments based on the parameter of the video file and the parameter of the video segment.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 17-A and 17-B are schematic diagrams illustrating an exemplary process for determining a background image; and FIGS. 18-A, 18-B, and 18-C are schematic diagrams illustrating an exemplary process for determining one or more moving objects.

DETAILED DESCRIPTION

Figure 1:
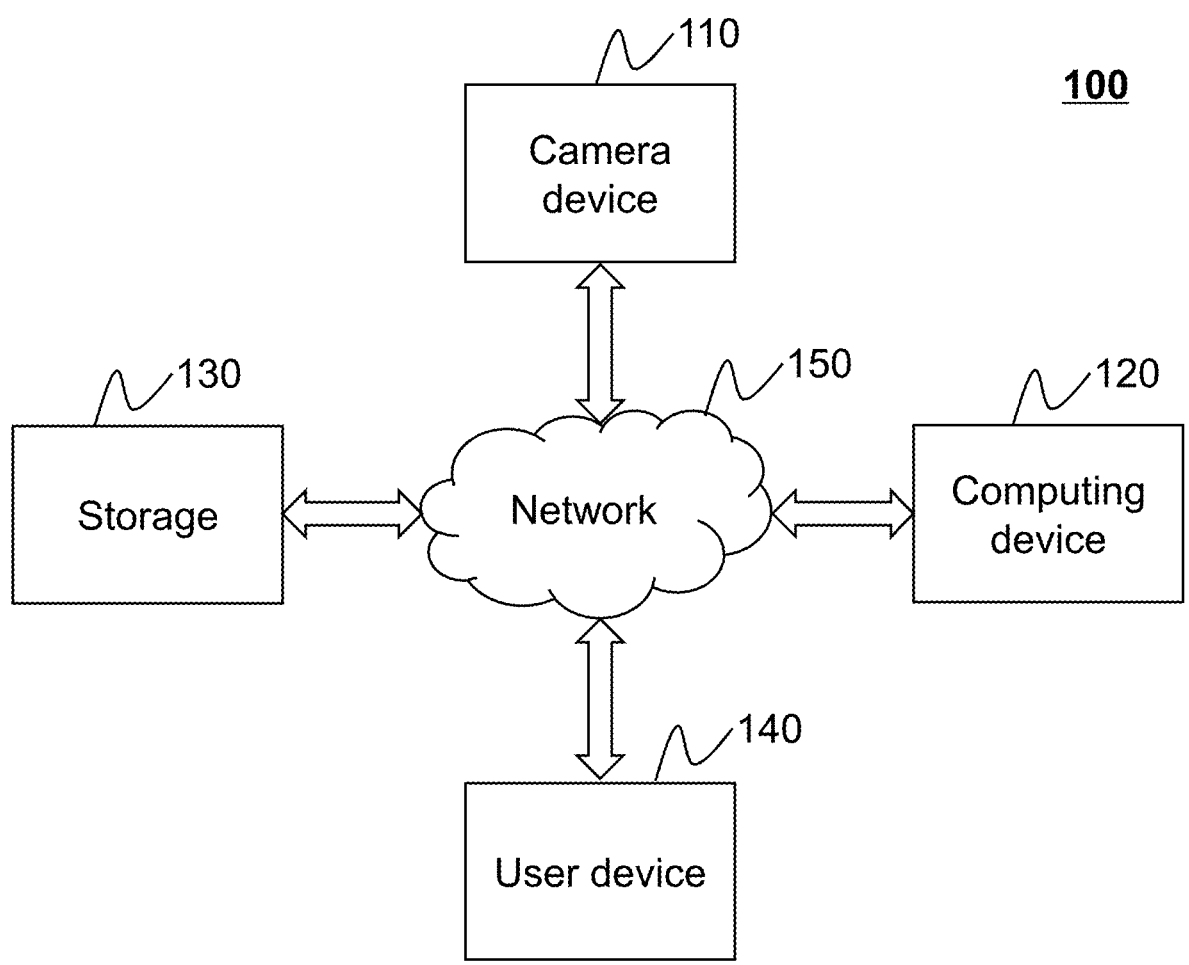
FIG. 1 is a schematic diagram illustrating an exemplary video processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expression if they achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the disclosure describes systems and methods for video processing. The video processing system may be configured to generate a video synopsis based on a distributed computing method. For example, the video processing system may segment a video file into a plurality of video fragment, and distribute the video fragments to a plurality of computing nodes to be processed. The video processing system may extract moving object information from the video fragments, and generate a video synopsis based on the moving object information extracted from the video fragments. For persons having ordinary skills in the art, multiple variations or modifications may be made under the teachings of the present disclosure.

The following description is provided to help better understanding video processing methods or systems. The term "image" used in this disclosure may refer to a static picture or a video frame of a video. This is not intended to limit the scope the present disclosure. For persons having ordinary skills in the art, a certain amount of variations, changes, and/or modifications may be deducted under guidance of the present disclosure. Those variations, changes, and/or modifications do not depart from the scope of the present disclosure.

FIG. 1 is a block diagram illustrating an exemplary video processing system 100 according to some embodiments of the present disclosure. In some embodiments, video processing system 100 may be used in an intelligent transportation system (ITS), a security technology, a transportation management, a prison system, an astronomical observation system, a monitoring system, or the like, or any combination thereof. In some embodiments, video processing system 100 may include a 2D camera system, a 3D camera system, a panoramic camera system, a virtual reality (VR) camera system, a web camera system, an instant picture camera system, an electronic eye system, a camcorder system, a thermal imaging device system, a visible imaging device system, an ultrasonic video processing system, a radiological scanning video processing system, or the like, or any combination thereof. For example, video processing system 100 may be used for identifying a specific moving object in a surveillance video. The moving object may include a vehicle, a boat, a flying machine, a person, an animal, or the like, or a combination thereof.

It should be noted that video processing system 100 described below is merely provided for illustration purposes and not intended to limit the scope of the present disclosure.

As illustrated in FIG. 1, video processing system 100 may include a camera device 110, a computing device 120, a storage 130, a user device 140, and a network 150. In some embodiments, camera device 110 and computing device 120 may be integrated as a single device. Alternatively, camera device 110 may be installed at a remote location from computing device 120.

Camera device 110 may be configured to capture an image. In some embodiments, camera device 110 may include a stereo camera configured to capture an image. Additionally or alternatively, the stereo camera may include a binocular vision device or a multi-camera. Additionally or alternatively, camera device 110 may include a digital camera. The digital camera may include a 2D camera, a 3D camera, a panoramic camera, a VR (virtual reality) camera, a web camera, an instant picture camera, or the like, or any combination thereof. The digital camera may be added to or be part of a medical imaging equipment, a night vision equipment, a radar system, a sonar system, an electronic eye, a camcorder, a thermal imaging device, a smartphone, a tablet PC, a laptop, a wearable device (e.g., 3D glasses), an eye of a robot, or the like, or any combination thereof. The digital camera may also include an optical sensor, a radio detector, an artificial retina, a mirror, a telescopes, a microscope, or the like, or any combination thereof.

In some embodiments, camera device 110 may be configured to capture one or more images of an object. The object may be a moving object or a still object. The object may include a still vehicle, a moving vehicle, a passenger, a traffic light, a traffic sign, a road type, or the like, or any combination thereof. In some embodiments, camera device 110 may be configured to capture two images at the same time by two cameras or at different times by one camera. For example, camera device 110 may capture a first image of an object at a first time and a second image of the object at a second time. In some embodiments, camera device 110 may capture images corresponding to the same (or substantially similar) field of view (FOV) or different FOVs. The size of the FOV may be adjusted according to the position of the camera, orientation of the camera, time of capturing, or the like, or a combination thereof.

In some embodiments, camera device 110 may transmit the captured image to computing device 120, storage 130, and/or user device 140 via network 150.

Computing device 120 may be configured to process data and/or generate a control signal for video processing system 100. In some embodiments, the data may include image data or video data. In some embodiments, the data may be analog or digital. In some embodiments, computing device 120 may generate a control signal including, for example, a control signal for camera device 110 to capture an image, a control signal for identifying an object from an image, a control signal for storing/deleting data, a control signal for transmitting data among components of video processing system 100, or the like, or any combination thereof. In some embodiments, the control signal may be generated based on the data received from camera device 110, storage 130, user device 140, or an instruction from a user.

In some embodiments, computing device 120 may include one or more processors to perform operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, computing device 120 may include a microprocessor to process a video captured by camera device 110.

In some embodiments, computing device 120 may acquire data from camera device 110, storage 130, and/or user device 140 via network 150. In some embodiments, the data and/or video(s) processed by computing device 120 may be saved to storage 130. In some embodiments, computing device 120 may include storage 130 configured to store data and/or instructions.

In some embodiments, computing device 120 may further include input/output components (not shown) configured to receive information from or output information to camera device 110, computing device 120, storage 130, and/or other component(s) of video processing system 100. In some embodiments, the input/output components may include a keyboard, a liquid crystal display (LCD), a light emitting diode (LED) based display, a flat panel display, a cathode ray tube (CRT), a 3D display, a plasma display panel, a touch screen, a mouse, a remote controller, or the like, or any combination thereof. In some embodiments, the information displayed on the input/output components may include an image, a video, a user interface, a value, a text, control information, a program, software, an algorithm, or the like, or any combination thereof. In some embodiments, the image may include an original image, a reconstructed image, a processed image, or the like, or any combination thereof. In some embodiments, the user interface may include a user interaction interface, a graphical user interface, a user-defined interface, or the like, or any combination thereof. In some embodiments, the control information may include a capture control parameter, a processing parameter, an adjustment parameter, or the like, or any combination thereof.

Storage 130 may be configured to store data from camera device 110, computing device 120, user device 140, and/or other component(s) of video processing system 100. In some embodiments, storage 130 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, storage 130 may be configured to store one or more programs and/or instructions that may be executed by the processor(s) of video processing system 100 to perform exemplary methods described in this disclosure. For example, storage 130 may be configured to store program(s) and/or instruction(s) executed by the processor(s) of video processing system 100 to capture image(s), process image data or video data, or display any intermediate result. For example, a ROM may store an algorithm for computing device 120 to process image(s) and/or video(s).

User device 140 may be configured to receive any information from camera device 110, computing device 120, or storage 130 via network 150. For example, user device 140 may receive a processed video from computing device 120. In some embodiments, user device 140 may include a smart phone, a personal computer, a tablet, a laptop, a wearable device (e.g., a smart watch, a pair of smart glasses, or the like), or the like, or a combination thereof. In some embodiments, user device 140 and computing device 120 may be integrated in one device configured to perform exemplary functions of the user device and computing device 120 disclosed in this disclosure.

Network 150 may be configured to facilitate communications among the components of video processing system 100 including camera device 110, computing device 120, storage 130, and user device 140. For example, camera device 110 may transmit the captured image to computing device 120 via network 150. As another example, computer device 120 may transmit data processed and/or generated to user device 140 via network 150.

In some embodiments, network 150 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, camera device 110, computing device 120, storage 130, user device 140, or network 150 may be connected to or communicate with each other directly or indirectly.

In some embodiments, camera device 110, computing device 120, storage 130, and user device 140 may be integrated as one device. In some embodiments, the functions of video processing system 100 disclosed in this application may be implemented by camera device 110, computing device 120, storage 130, user device 140, or network 150, or any combination thereof.

In some embodiments, two or more devices of camera device 110, computing device 120, storage 130 and user device 140 may be integrated as one device. For example, computing device 120 and user device 140 may be integrated as one device. As another example, camera device 110 and computing device 120 may be integrated as one device. In some embodiments, the above devices may be located remotely from each other. Merely by way of example, computing device 120 may be implemented on a cloud platform (e.g., a cloud computing platform or cloud storing platform). As another example, user device 140 may be controlled by a remote system (e.g., a remote medical system or a remote security system).

It should be understood that, the components of video processing system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware (e.g., processor 202 illustrated in FIG. 2). Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

It should be noted that the above description of video processing system 100 is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, input/output device 140 may be integrated in computing device 120.

Figure 2:
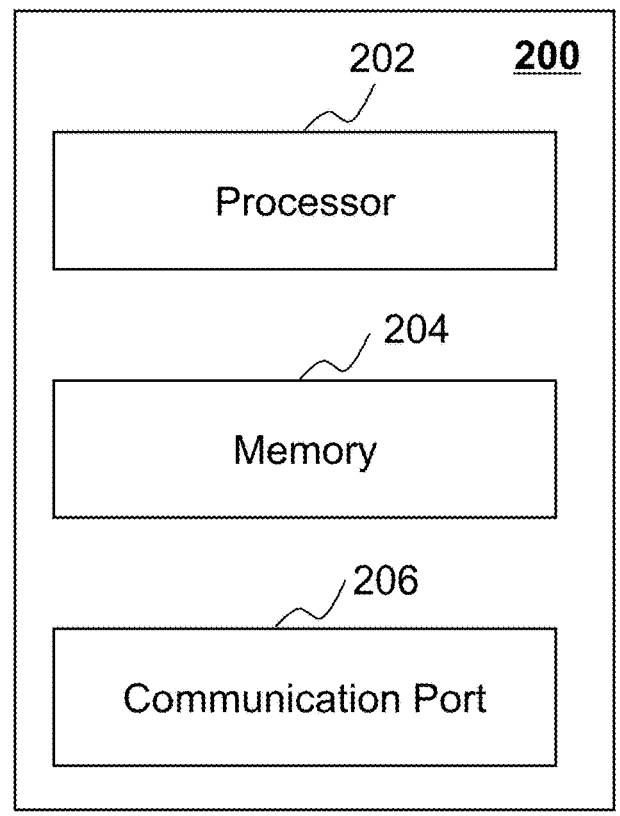
FIG. 2 is a block diagram illustrating exemplary hardware and/or software components of an exemplary processing device according to some embodiments of the present disclosure.

FIG. 2 is a schematic diagram illustrating exemplary hardware and software components of processing device 200 on which computing device 120 or user device 140 may be implemented according to some embodiments of the present disclosure. In some embodiments, processing device 200 may include a processor 202, a memory 204, and a communication port 206.

Processor 202 may execute computer instructions (program code) and perform functions of computing device 120 and/or user device 140 in accordance with techniques described herein. Computer instructions may include routines, programs, objects, components, data structures, procedures, modules, and functions, which perform particular functions described herein. For example, processor 202 may process image data or video data received from camera device 110, storage 130, user device 140, or any other component of video processing system 100. In some embodiments, processor 202 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, processor 202 may include a microcontroller to process video data from camera device 110 for a video synopsis generation.

Memory 204 may be configured to store data, image(s) and/or video(s) received from camera device 110, storage 130, user device 140, or any other component of video processing system 100. In some embodiments, memory 204 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, memory 204 may be configured to store one or more programs and/or instructions to perform exemplary methods described in the present disclosure. For example, memory 204 may store a program for computing device 120 for identifying a vehicle in a video frame.

Communication port 206 may be configured to transmit to and receive information or data from camera device 110, storage 130, and/or user device 140 via network 150. In some embodiments, communication port 206 may include a wired port (e.g., a Universal Serial Bus (USB) port, a High Definition Multimedia Interface (HDMI) port, or the like) or a wireless port (a Bluetooth port, an infrared interface, a WiFi port, or the like).

Figure 3:
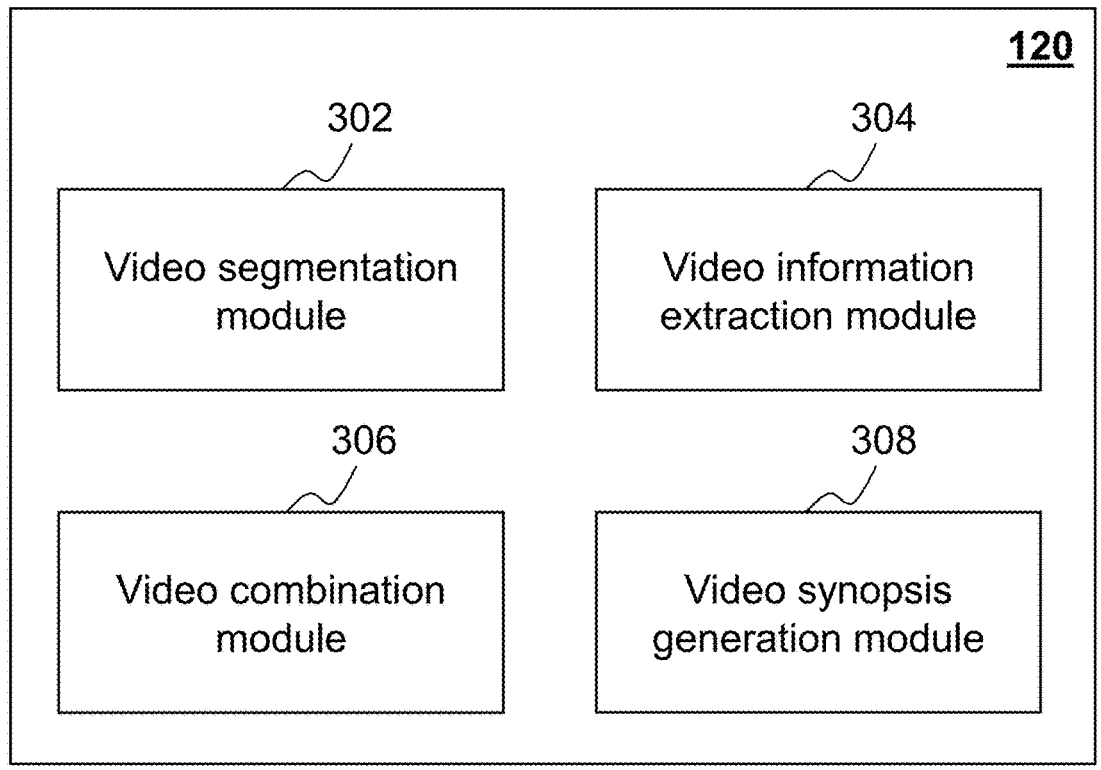
FIG. 3 is a block diagram illustrating an exemplary computing device according to some embodiments of the present disclosure.

FIG. 3 is a block diagram illustrating an exemplary computing device 120 according to some embodiments of the present disclosure. Computing device 120 may include a video segmentation module 302, a video information extraction module 304, a video combination module 306, and a video synopsis generation module 308.

Video segmentation module 302 may be configured to segment a video file into a plurality of video fragments. In some embodiments, the format of the video file may include stream video format or non-stream video format. Exemplary stream video formats include Flash video (FLV), Real Media (RM), MOV, WebM, Advanced Streaming Format (ASF), ISMA, etc. Exemplary non-stream video formats include WAV, Windows Media Audio (WMA), Audio Video Interleaved (AVI), Matroska (MKV), Moving Picture Expert Group (MPEG), Moving Picture Expert Group 4 (MP4), etc. In some embodiments, video segmentation module 302 may segment the video file based on a parameter of the video file. For example, for a non-stream video file, video segmentation module 302 may segment the video file based on a frame index of the video file. As another example, for a stream video file, video segmentation module 302 may segment the video file based on the size of the video file. In some embodiments, two adjacent video fragments may include an overlapping part (e.g., one or more common video frames).

Video information extraction module 304 may be configured to determine information of a moving object (also referred to as "moving object information) from the video fragment. The moving object may include a vehicle, a boat, a flying machine, a person, an animal, or the like, or a combination thereof. Video information extraction module 304 may determine the moving object based on a foreground detection algorithm. In some embodiments, the moving object information may include a moving path sequence (or different positions at different time points) of the moving object in the video fragment, an imaging sequence of the moving object in the video fragment, etc. As used herein, the moving path sequence may refer to sequence data indicating the locations and sizes of the moving object in two or more frames in the video file. The imaging sequence may refer to an image sequence including a plurality of images of the moving object extracted from the video file at different time points. The moving object information may further include a feature of the moving object. The feature of the moving object may include color, velocity, size, direction, type, or the like, or a combination thereof.

In some embodiments, video information extraction module 304 may generate a file including the determined moving object information (a moving object information file). In some embodiments, a moving object information file may correspond to a moving object. In some embodiments, video information extraction module 304 may generate an index file used to record summary information of the video fragment. The summary information of the video fragment may include the number of the moving objects, location of the moving object information file, or the like, or a combination thereof. In some embodiments, video information extraction module 304 may output the index file and the moving object information file to video combination module 306 or video synopsis generation module 308.

In some embodiments, video information extraction module 304 may include a plurality of sub-modules (not shown), and the sub-module may be configured to process a video fragment. In some embodiments, the plurality of sub-modules may be implemented via a plurality of threads. For example, the plurality of sub-modules may be implemented via a distributed computing system including a plurality of computing nodes. As used herein, a distributed computing system may refer to a collection of autonomous computers linked by a network which uses hardware or software to produce an integrated computing facility. Merely by way of example, video information extraction module 304 may distribute the video fragments to a plurality of computing nodes. The computing nodes may process the data of the video fragments respectively. In some embodiments, the video fragments may be distributed to the computing nodes evenly or unevenly.

In some embodiments, at least one of the video fragments may be further divided into a plurality of sub-fragments. Video information extraction module 304 may distribute the video fragments to a plurality of computing nodes. For a specific video fragment that is divided into sub-fragments, the corresponding computing node may process the video fragment by processing the sub-fragments in order (e.g., beginning from the first sub-fragment). If all the sub-fragments of the specific video fragment are processed, the corresponding computing node may be idle or assigned to other task. If the computing node is idle, video information extraction module 304 may distribute other video fragment(s) or the sub-fragments thereof to the idle computing node for processing.

Merely by way of example, video segmentation module 302 may divide a video file into three fragments, for example, fragment A, fragment B, and fragment C. Video segmentation module may further divide each fragment into three sub-fragments. For instance, fragment A may be divided into sub-fragments including $A_1$, $A_2$, and $A_3$, fragment B may be divided into sub-fragments including $B_1$, $B_2$, and $B_3$, and fragment C may be divided into sub-fragments including $C_1$, $C_2$, and $C_3$. Video information extraction module 304 may distribute the three fragments including fragment A, fragment B, and fragment C to three computing nodes, for example, computing node 1, computing node 2, and computing node 3. For fragment A, computing node 1 may process it by processing the sub-fragments $A_1$, $A_2$, and $A_3$ in order. Likewise, fragment B and fragment C may be processed in the same manner. At a certain moment, if computing node 1 completes the processing of fragment A first, and at that time computing node 2 and computing node 3 are processing sub-fragment $B_1$ and sub-fragment $C_1$ respectively. In this situation, video information extraction module 304 may distribute sub-fragment $B_2$ or sub-fragment $C_2$ to computing node 1 for processing. Likewise, if any one of the computing nodes is idle, video information extraction module 304 may distribute a sub-fragment to the idle computing node for processing.

Video combination module 306 may be configured to combine the index files of the video fragments. In some embodiments, video combination module 306 may generate one or more combined index files. For example, video combination module 306 may combine all the index files as one combined index file. As another example, video combination module 306 may group the index files and generate multiple combined index files, and a group of index files corresponds to a combined index file. In some embodiments, video combination module 306 may select a background image from the video fragments for the combined index file. For example, video combination module 306 may select a background of one video fragment as the background image. In some embodiments, video combination module 306 may transmit the combined index file(s) and the corresponding background image(s) to video synopsis generation module 308. In some embodiments, video combination module 306 may transmit the combined index file(s) and the corresponding background image(s) to any storage disclosed elsewhere in the present disclosure (e.g., storage 130).

Video synopsis generation module 308 may be configured to generate a video synopsis based on the combined index file(s) and the moving object information. In some embodiments, video synopsis module 308 may select one or more moving objects according to a feature of the moving objects (e.g., color, velocity, size, direction, type). In some embodiments, video synopsis generation module 308 may arrange the sequences of the selected moving objects (e.g., the moving path sequence, the imaging sequence, or the like) based on the combined index file(s). In some embodiments, video synopsis generation module 308 may group the video fragments according to the grouped index files. In some embodiments, video synopsis generation module 308 may generate the video synopsis in real time or after a certain time delay.

In some embodiments, alternatively or additionally, video synopsis generation module 308 may generate a video abstraction. As used herein, a video abstraction may refer to a list of images indicating a plurality of moving objects. Video synopsis generation module 308 may select an image from an imaging sequence of a moving object, and the selected image may be used to identity the moving object. Video synopsis generation module 308 may select a plurality of images corresponding to a plurality of moving objects and generate a list of images (i.e., the video abstraction). If any one of the list of images is clicked, a section corresponding to the moving object in the video file may be played.

It should be noted that the above description is merely provided for the purposes of illustration and not intended to limit the scope of the present disclosure. For persons having ordinary skills in the art, multiple variations or modifications may be made under the teachings of the present disclosure. However, those variations and modifications do not depart from the scope of the present disclosure. For example, any two or more modules in computing device 120 may be integrated as one module. As another example, computing device 120 may further include a storage module (not shown) to store any information or data generated by any module in computing device 120 during the process. As a further example, computing device 120 may share a storage with camera device 110 or user device 140.

Figure 4:
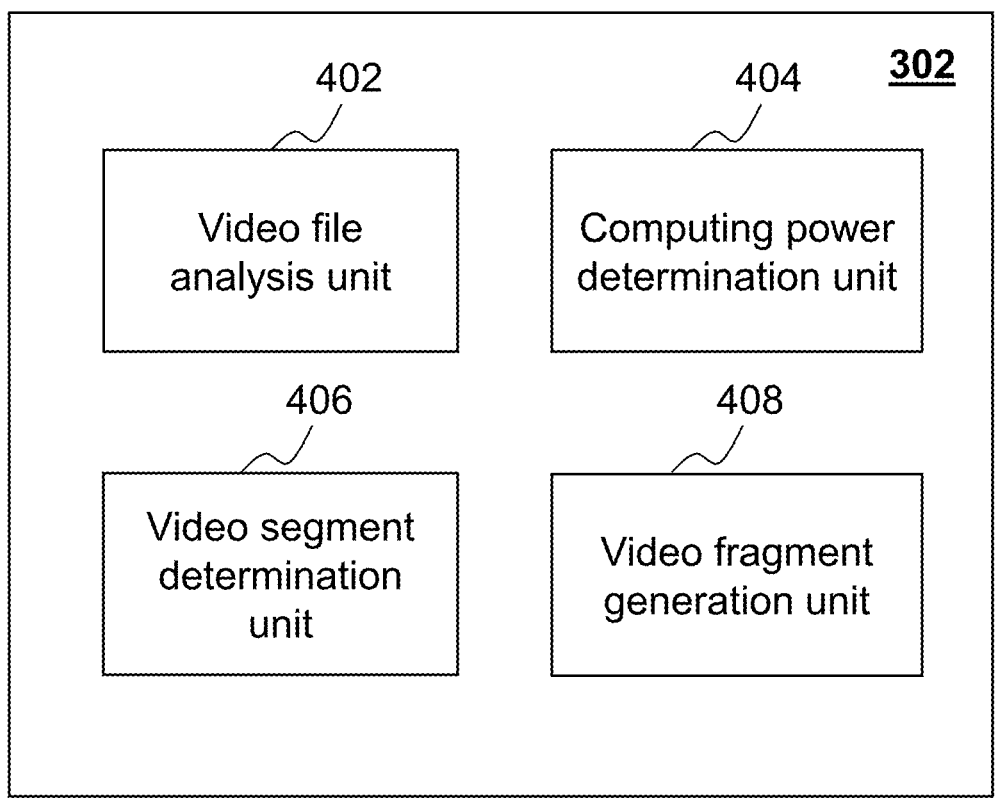
FIG. 4 is a block diagram illustrating an exemplary video segmentation module according to some embodiments of the present disclosure.

FIG. 4 is a block diagram illustrating an exemplary video segmentation module 302 according to some embodiments of the present disclosure. Video segmentation module 302 may include a video file analysis unit 402, a computing power determination unit 404, a video segment determination unit 406, and a video fragment generation unit 408.

Video file analysis unit 402 may be configured to determine and/or analyze a parameter of the video file. The parameter of the video file may include a type of a frame, the lengths of the frames of the video file, the locations of the frames of the video file, the number of the frames in the video file, a frame index of the video file, the size of the video file, or the like, or a combination thereof. For example, video file analysis unit 402 may generate a frame index based on the type of frame, the length of the frame, the location of the frame, and the number of frames in the video file. In some embodiments, the video file may include a stream video file or a non-stream video file. In some embodiments, video file analysis unit 402 may transcode the non-stream video file to a stream video file.

Computing power determination unit 404 may be configured to determine a computing power of video information extraction module 304. As mentioned above, video information extraction module 304 may be implemented via a plurality of threads or computing nodes. The computing power may include the number of available threads, the number of free kernels of a CPU, the number of free CPUs, or the like, or a combination thereof. In some embodiments, computing power determination unit 404 may be integrated in video information extraction module 304. In some embodiments, computing power determination unit 404 may run independently as an independent module in video processing system 100.

Video segment determination unit 406 may be configured to determine a parameter of a video fragment to be segmented (hereafter referred to as a "video segment") based on the parameter of the video file and the computing power of video information extraction module 304. The parameter of the video segment may include the number of frames in a video segment, size of a video segment, the number of the video segments, or the like, or a combination thereof. For example, video segment determination unit 406 may determine the number of frames in a video segment by dividing the total number of frames in the video file by the computing power. As another example, video segment determination unit 406 may determine the size of the video segment by dividing the size of the video file by the computing power.

Video fragment generation unit 408 may be configured to generate a plurality of video fragments based on the parameter of the video file, the computing power of video information extraction module 304, or the parameter of the video segment. In some embodiments, video fragment generation unit 408 may generate an array including multiple elements, and each element may correspond to a video fragment. The element may include video fragment information. The video fragment information may include the location of the video fragment in the video file, the serial number of the video fragment, the location of the beginning frame of the video fragment, lengths of the frames in the video fragment, the number of the frames in the video fragment, or the like, or combination thereof. For example, the location of the video fragment may include a start offset and an end offset (or a length of the video fragment). The offset may correspond to the location of the video fragment in the video file. As used herein, the start offset may correspond to the start position of the video fragment in the video file (e.g., the position of the first frame of the video fragment in the video file). The end offset may correspond to the position of the video fragment in the video file. For example, for the first video fragment, the start offset may be 0, and the end offset may be D, where D may refer to the length of the video fragment.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, any two or more units in video segmentation module 302 may be integrated as one unit. As another example, video segment determination unit 406 may be optional, and video fragment generation unit 408 may generate the video fragments based on the parameter of the video file and the computing power.

Figure 5:
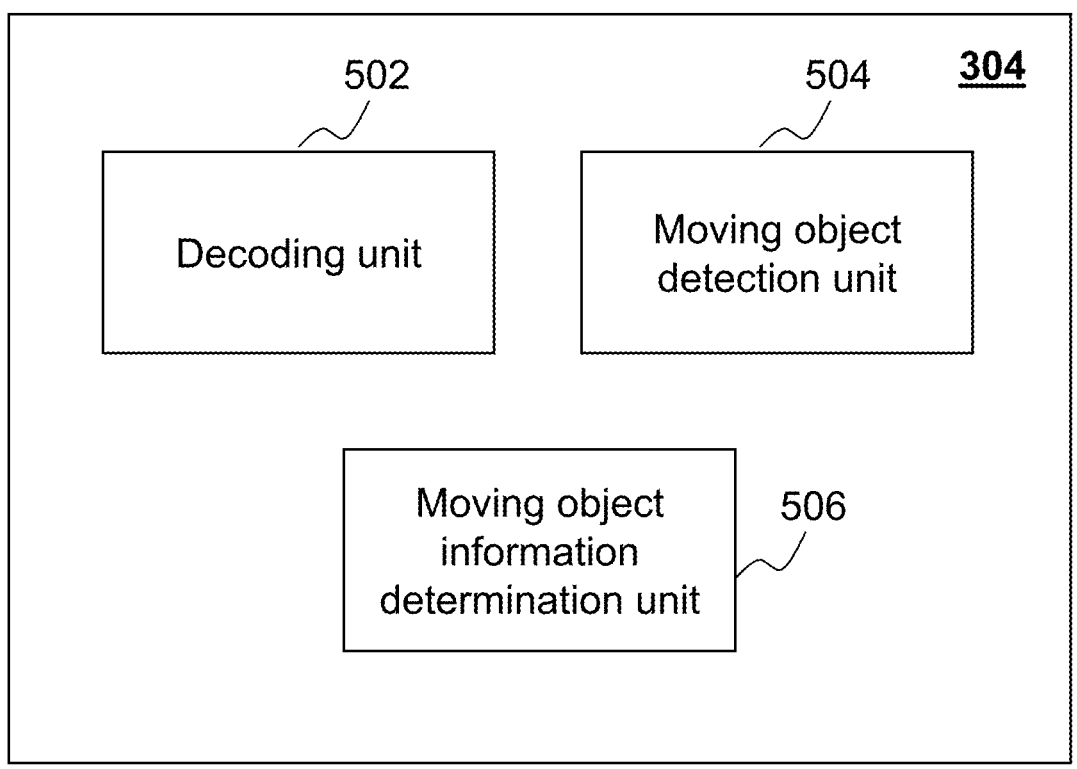
FIG. 5 is a block diagram illustrating an exemplary video information extraction module according to some embodiments of the present disclosure.

FIG. 5 is a block diagram illustrating an exemplary video information extraction module 304 according to some embodiments of the present disclosure. Video information extraction module 304 may include a decoding unit 502, a moving object detection unit 504 and a moving object information determination unit 506.

Decoding unit 502 may be configured to decode the video fragment. In some embodiments, after camera device 110 captures a video and generates a video file, camera device 110 or any other component in video processing system 100 may encode the video file and save it in any storage disclosed elsewhere in the present disclosure. For example, camera device 110 may compress the video file and save it in storage 130. In some embodiments, video segmentation module 302 may segment the encoded video file into a plurality of video fragments. Decoding unit 502 may decode the video fragments based on a decoding method. For example, decoding unit 502 may decompress the video fragment for further processing. In some embodiments, decoding unit 502 may be implemented via a decoder.

Moving object detection unit 504 may be configured to detect one or more moving objects in the video fragment. The moving object may include a vehicle, a boat, a flying machine, a person, an animal, etc. In some embodiments, moving object detection unit 504 may detect the moving object based on a foreground detection algorithm. For example, moving object detection unit 504 may train a background image from the video fragment, compare the video data of the video fragment (e.g., a plurality of frames in the video fragment) with the background image, and determine the one or more moving objects based on the result of the comparison. In some embodiments, for any of the one or more moving objects, moving object detection unit 504 may further determine a moving path sequence of the moving object or an imaging sequence of the moving object.

Moving object information determination unit (also referred to as "structuralization unit") 506 may be configured to extract moving object information in the video fragment. For example, moving object information determination unit 506 may perform a structuralization on a moving object detected by moving detection unit 504 and determine a feature of the moving object. The feature of the moving object may include color, velocity, size, direction, type, or the like, or a combination thereof. Moving object information determination unit 506 may also be configured to generate a moving object information file. In some embodiments, moving object information determination unit 506 may generate one moving object information file for one moving object. In some embodiments, moving object information determination unit 506 may generate a plurality of moving object information files for one moving object. In some embodiments, moving object information determination unit 506 may generate one moving object information file for a plurality of moving objects. In some embodiments, moving object information determination nit 506 may further generate an index file to record summary information of the video fragment. The summary information of the video fragment may include the number of moving objects, location of the moving object information file, etc. In some embodiments, moving object information determination unit 506 may update the moving object information file and the index file in real time.

In some embodiments, video information extraction module 304 may further include a storage unit (not shown) configured to store the moving object information, the moving object information file, or the index file. In some embodiments, the moving object information, the moving object information file, or the index file may be stored in any storage device disclosed elsewhere in the present disclosure.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, decoding unit 502 may be optional. As another example, moving object detection unit 504 and moving object information determination unit 506 may be integrated into one unit.

Figure 6:
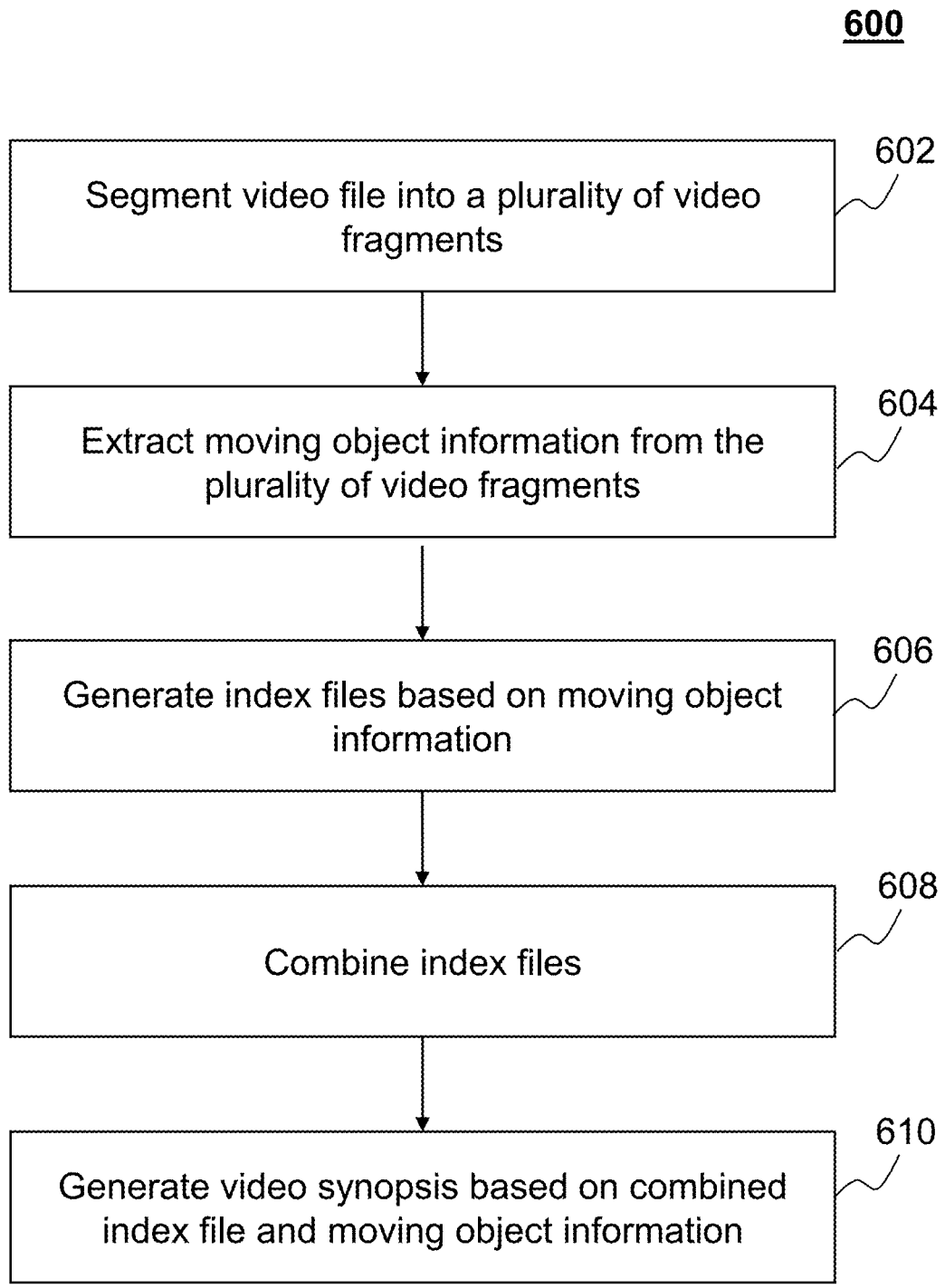
FIG. 6 is a flowchart illustrating an exemplary process for generating a video synopsis according to some embodiments of the present disclosure.

FIG. 6 is a flowchart illustrating an exemplary process 600 for generating a video synopsis according to some embodiments of the present disclosure. In 602, video segmentation module 302 may segment a video file into a plurality of video fragments. In some embodiments, the format of the video file may include stream video format or non-stream video format. Exemplary stream video format may include FLV, RM, MOV, WebM, ASF, ISMA, etc. Exemplary non-stream video format may include WAV, WMA, AVI, MKV, MPG, MP4, etc. In some embodiments, video segmentation module 302 may segment the video file based on a parameter of the video file. For example, for a non-stream video file, video segmentation module 302 may segment the video file based on a frame index of the video file. As another example, for a stream video file, video segmentation module 302 may segment the video file based on the size of the video file.

In 604, video information extraction module 304 may extract moving object information from the plurality of video fragments. The moving object may include a vehicle, a boat, a flying machine, a person, an animal, etc. The moving object information may include a moving path sequence of the moving object, an imaging sequence of the moving object, a feature of the moving object (e.g., color, velocity, size, direction, type), etc. In some embodiments, video information extraction module 304 may generate a moving object information file based on the moving object information.

In some embodiments, video information extraction module 304 may extract the moving object information from the plurality of video fragments based on a distributed computing method. Merely by way of example, video information extraction module 304 may distribute the plurality of video fragments to a plurality of computing nodes to be processed. In some embodiments, the distributed computing method may be implemented via a group of computers, and the computer may work as a computing node. In some embodiments, the group of computers may communicate with each other via a network. In some embodiments, the group of computers may process data in parallel. In some embodiments, the group of computers may have accesses to a common memory. In some embodiments, the computers may include separate memories respectively. In some embodiments, the distributed computing method may be implemented via a distributed program. The distributed program may have a basic architecture including client-server, three-tier, n-tier, peer-to-peer, etc.

In 606, video information extraction module 304 may determine a plurality of index files based on the moving object information. In some embodiments, the index file may include summary information of the video fragment. The summary information of the video fragment may include the number of the moving objects, location of the moving object information file, or the like, or a combination thereof. In some embodiments, the index files may be stored in memory 204 or any storage disclosed elsewhere in the present disclosure.

In 608, video combination module 306 may combine the index files. In some embodiments, video combination module 306 may combine all the index files and generate one combined index file. In some embodiments, video combination module 306 may combine the index files in a form of groups. For example, video combination module 306 may group the index files as multiple groups, and generate multiple combined index files based on the groups of index files. In some embodiments, the combined index file(s) may be stored in any storage disclosed elsewhere in the present disclosure (e.g., storage 130) or transmitted to video synopsis module 308 to be further processed.

In 610, video synopsis generation module 308 may generate a video synopsis based on the combined index file(s) and the moving object information. In some embodiments, the video synopsis may include a plurality of moving objects. In some embodiments, during the generation of the video synopsis, video synopsis generation module 308 may arrange the moving objects according to an arrangement rule. In some embodiments, the arrangement rule may be a rule under which the moving objects are so arranged that the moving paths of the moving objects do not overlap with each other, or the moving objects in the video synopsis appear simultaneously or successively, or the video synopsis displays as many moving objects as possible.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional steps may be added between step 602 and step 604, or elsewhere in the exemplary process illustrated in FIG. 6. Examples of such steps may include storing or caching the acquired information. As another example, step 610 may be optional, and video synopsis generation module 308 may generate the video synopsis if needed.

Figure 7:
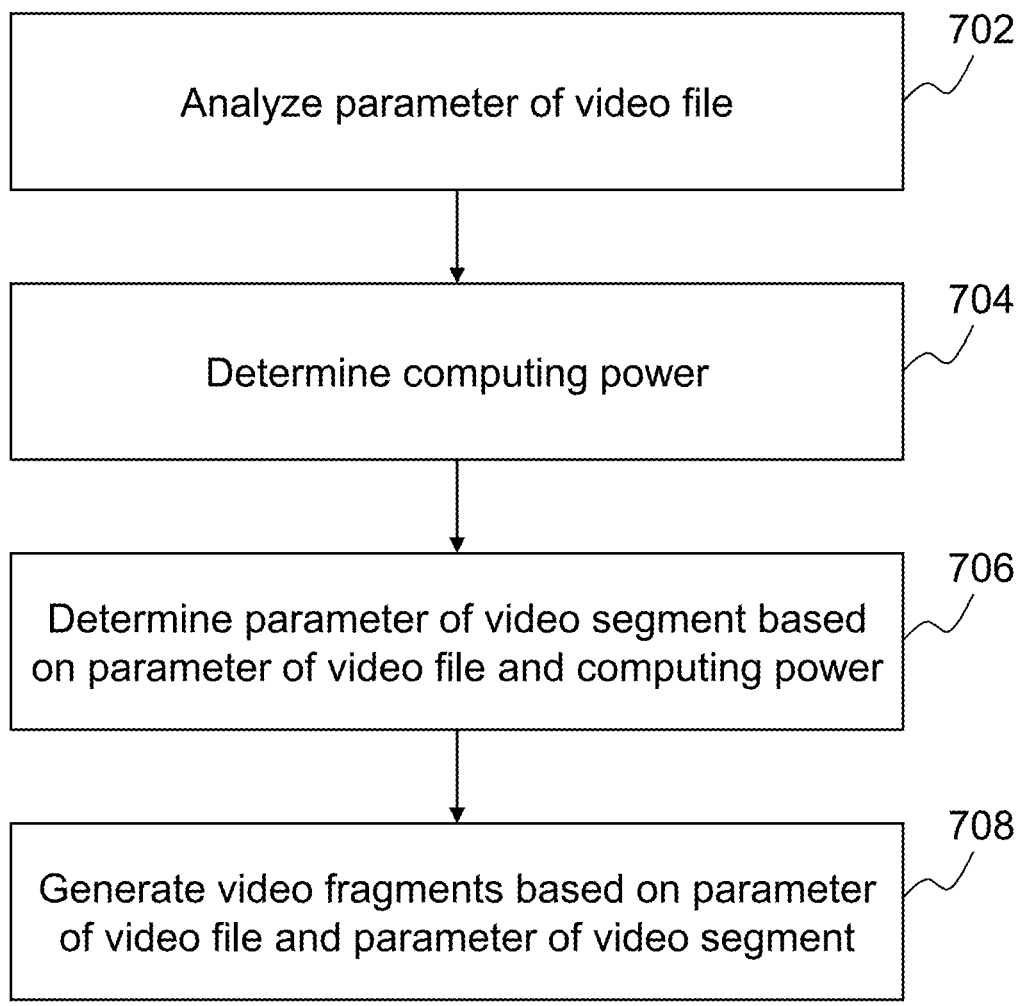
FIG. 7 is a flowchart illustrating an exemplary process for segmenting a video file according to some embodiments of the present disclosure.

In some embodiments, step 602 of process 600 may be performed based on an exemplary process 700 illustrated in FIG. 7 for segmenting the video file into a plurality of video fragments. In 702, video file analysis unit 402 may analyze a parameter of the video file. The parameter of the video file may include type of a frame, length of the frame, location of the frame, the number of the frames in the video file, a frame index of the video file, size of the video file, or the like, or a combination thereof.

In 704, computing power determination unit 404 may determine a computing power of video information extraction module 304. As mentioned above, the computing power of video information extraction module 304 may be relevant to the segmentation of the video file. For example, if video information extraction module 304 includes N available computing nodes, the number of the video fragments to be segmented (also referred to as "video segment") may be less than or equal to N. In some embodiments, the computing power may include the number of available threads, the number of free kernels of a CPU, the number of free CPUs, or the like, or a combination thereof.

In 706, video segment determination unit 406 may determine a parameter of the video segment based on the parameter of the video file and the computing power. The parameter of the video segment may include the number of frames in a video segment, size of a video segment, the number of the video segments, or the like, or a combination thereof. In some embodiments, video segment determination unit 406 may determine the parameter of the video segment by comparing a computing requirement with the computing power of video information extraction module 304. As used herein, a computing requirement may refer to the number of the computing nodes required for segmenting the video file. In some embodiments, the computing requirement may be determined based on default settings of video processing system 100 or an instruction from a user. For example, video segment determination unit 406 may read a predetermined parameter (e.g., the number of frames in a video segment) of the video segment from any storage disclosed elsewhere in the present disclosure (e.g., storage 130), and determine the computing requirement by dividing the number of frames in the video file by the predetermined number of frames in a video segment.

In 708, video fragment generation unit 408 may generate a plurality of video fragments based on the parameter of the video file and the parameter of the video segment. In some embodiments, the lengths of the video fragments may equal to each other or vary. In some embodiments, video fragment generation unit 408 may generate an array including multiple elements, and an element may correspond to a video fragment. The element may include video fragment information. The video fragment information may include location of the video fragment, the serial number of the video fragment, location of a beginning frame of the video fragment, lengths of the frames in the video fragment, the number of the frames in the video fragment, etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, video analysis unit 402 may transcode the video file from non-stream to stream before step 702.

Figure 8:
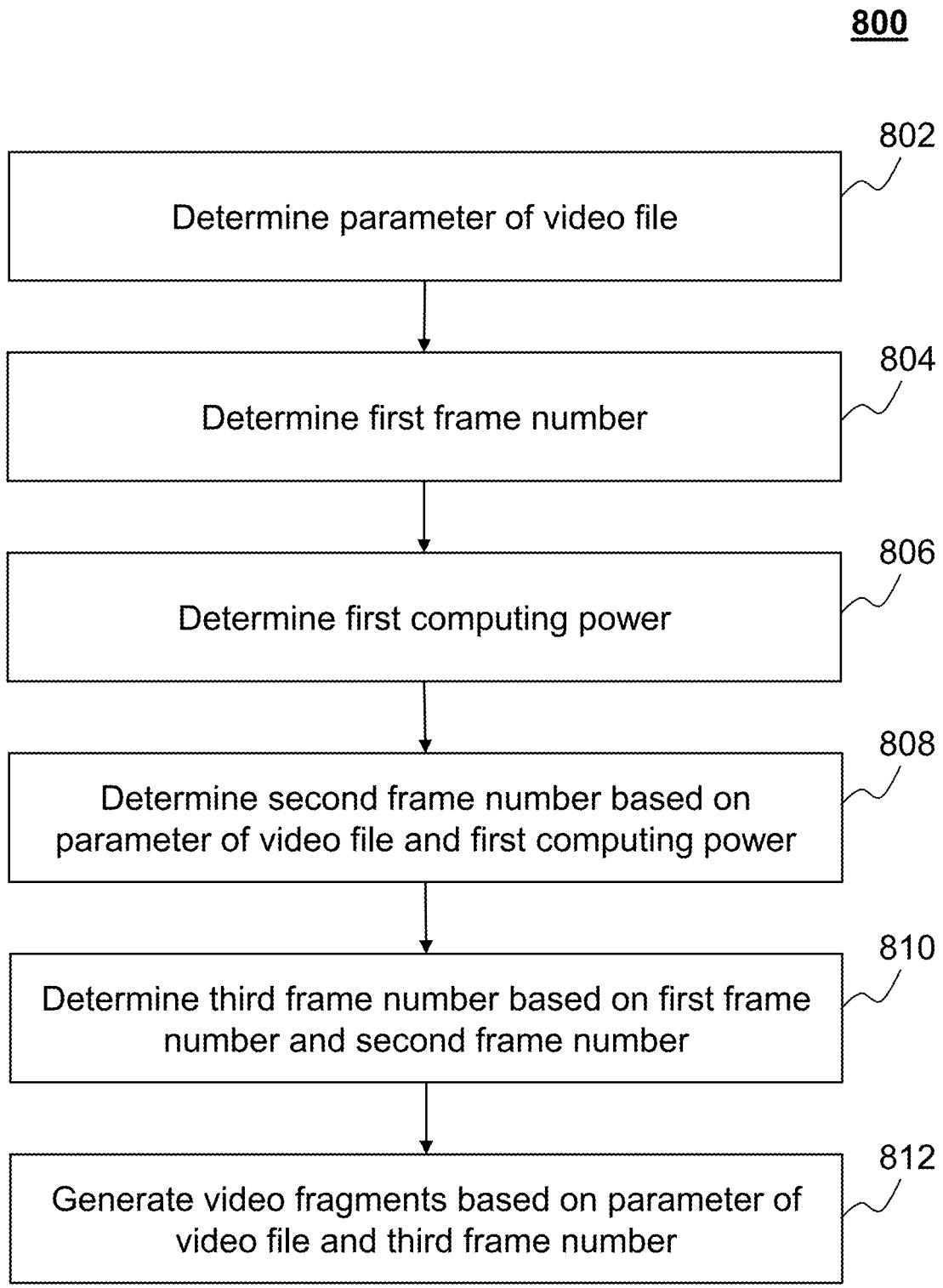
FIG. 8 is a flowchart illustrating an exemplary process for segmenting a video file according to some embodiments of the present disclosure.

Back to FIG. 6, in some embodiments, step 602 of process 600 may be performed based on an exemplary process 800 illustrated in FIG. 8 for segmenting the video file into a plurality of video fragments. In 802, video file analysis unit 402 may determine a parameter of the video file. In some embodiments, the parameter of the video file may include the number of frames in the video file, type of frames in the video file (e.g., an I frame, a P frame, a B frame, or the like), locations of the frames in the video file, lengths of the frames, or the like, or a combination thereof. In some embodiments, video file analysis unit 402 may generate a frame index file based on the parameter of the video file.

In 804, video file analysis unit 402 or video segment determination unit 406 may determine a first frame number a in a video segment. As used herein, a frame number refers to the number of frames in a video segment. In some embodiments, video file analysis unit 402 or video segment determination unit 406 may determine the first frame number a according to default settings of video processing system 100, or an instruction from a user.

For example, video segment determination unit 406 may read a predetermined frame number from a profile in any storage disclosed elsewhere in the present disclosure (e.g., storage 130).

In 806, computing power determination unit 404 may determine a computing power of video information extraction module 304. In some embodiments, the computing power may include the number of available threads, the number of free kernels of a CPU, the number of free CPUs, or the like, or a combination thereof.

In 808, video segment determination unit 406 may determine a second frame number b in a video segment based on the parameter of the video file and the computing power. For example, video segment determination unit 406 may determine the second frame number b by dividing the number of frames in the video file by the computing power (e.g., the number of free CPUs).

In 810, video segment determination unit 406 may determine a third frame number c based on the first frame number a and the second frame number b. In some embodiments, video segment determination unit 406 may determine the third frame number c of the video segment by comparing the first frame number a and the second frame number b and selecting the maximum one as the third frame number c.

In 812, video fragment generation unit 408 may generate a plurality of video fragments based on the parameter of the video file and the third frame number c. For example, video fragment generation unit 408 may segment the video file uniformly to a plurality of video fragments. The video fragment may include c frames, and the first frame in the video fragment is I frame.

In some embodiments, video fragment generation unit 408 may further generate an array including multiple elements, and an element may correspond to a video fragment. The element may include video fragment information. The video fragment information may include location of the video fragment, the serial number of the video fragment, location of a beginning frame of the video fragment, length of the frame in the video fragment, the number of the frames in the video fragment, etc.

Figure 9:
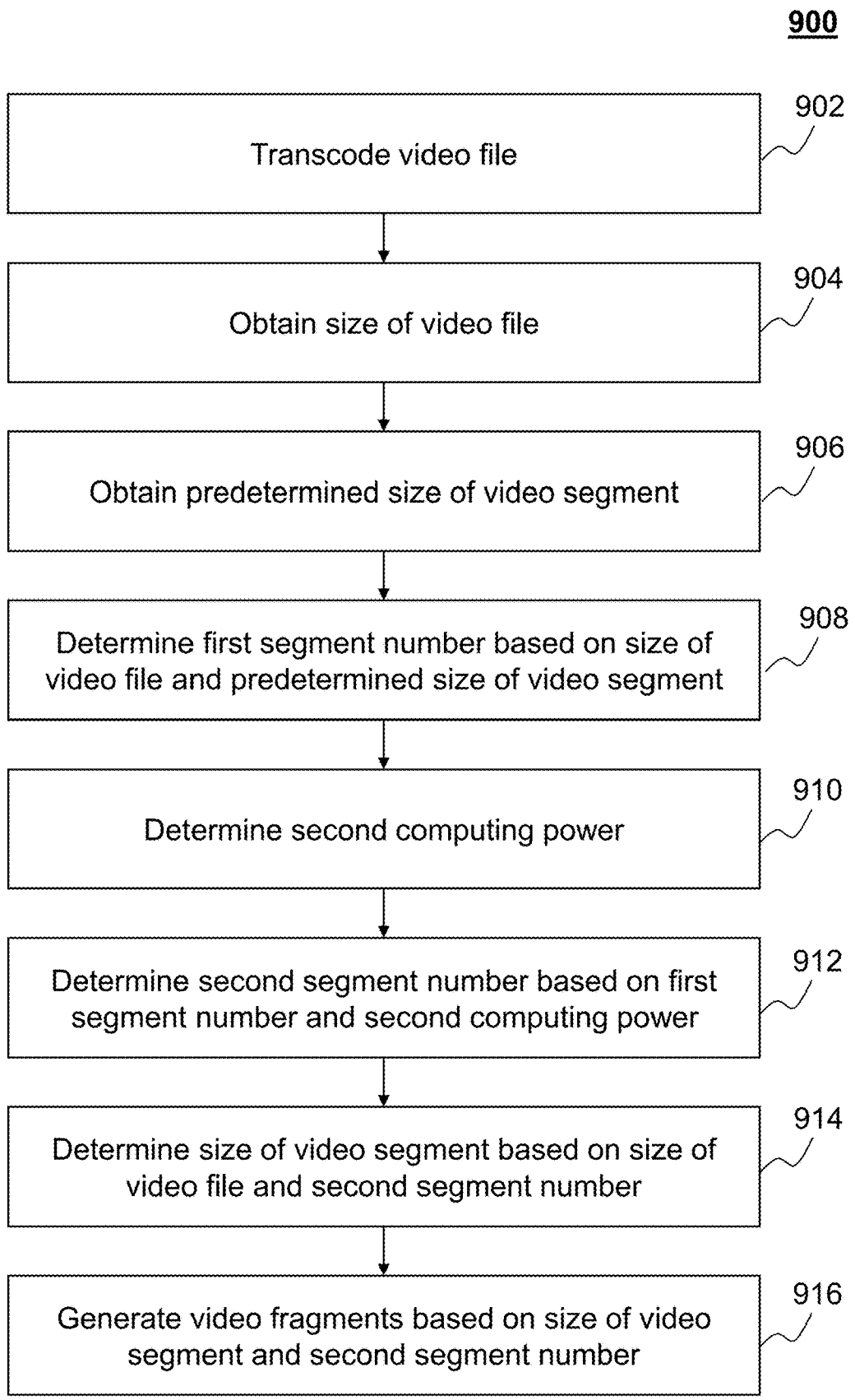
FIG. 9 is a flowchart illustrating an exemplary process for segmenting a video file according to some embodiments of the present disclosure.

Back to FIG. 6 again, in some embodiments, step 602 of process 600 may be performed based on an exemplary process 900 illustrated in FIG. 9 for segmenting the video file into a plurality of video fragments. In 902, video file analysis unit 402 may transcode the video file. In some embodiments, video file analysis unit 402 may transcode the video from a non-stream video file to a stream video file.

In 904, video file analysis unit 402 may obtain the size of the video file. In 906, video segment determination unit 406 may obtain a predetermined size d of the video segment according to default settings of video processing system 100, or an instruction from a user. For example, video segment determination unit 406 may read the predetermined size d (e.g., 64M) from a profile in any storage disclosed elsewhere in the present disclosure (e.g., storage 130).

In 908, video segment determination unit 406 may determine a first segment number e based on the size of the video file and the predetermined size d of the video segment. For example, video segment determination unit 406 may determine the first segment number e by dividing the size of the video file by the predetermined size d of the video segment.

In 910, computing power determination unit 404 may determine the computing power of video information extraction module 304. In some embodiments, the computing power may include the number of available threads, the number of free kernels of a CPU, the number of free CPUs, or the like, or a combination thereof.

In 912, video segment determination unit 406 may determine a second segment number f based on the first segment number e and the computing power. For example, video segment determination unit 406 may determine the second segment number f by comparing the first segment number e and the computing power (e.g., the number of free CPUs), and selecting the minimum one as the second segment number f.

In 914, video segment determination unit 406 may determine the size of the video segment based on the size of the video file and the second segment number f. For example, video segment determination unit 406 may determine the size of the video segment by dividing the size of the video file by the second segment number f.

In 916, video fragment generation unit 408 may segment the video file into a plurality of video fragments based on the size of the video segment and the second segment number f. In some embodiments, the sizes of the video fragments may be equal or unequal. In some embodiments, video fragment generation unit 408 may further generate an array including multiple elements, and an element may correspond to a video fragment. The element may include video fragment information. The video fragment information may include location of the video fragment, the serial number of the video fragment, location of a beginning frame of the video fragment, length of the frame in the video fragment, the number of the frames in the video fragment, etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, if the video file is a stream video file, step 902 may be optional.

Figure 10:
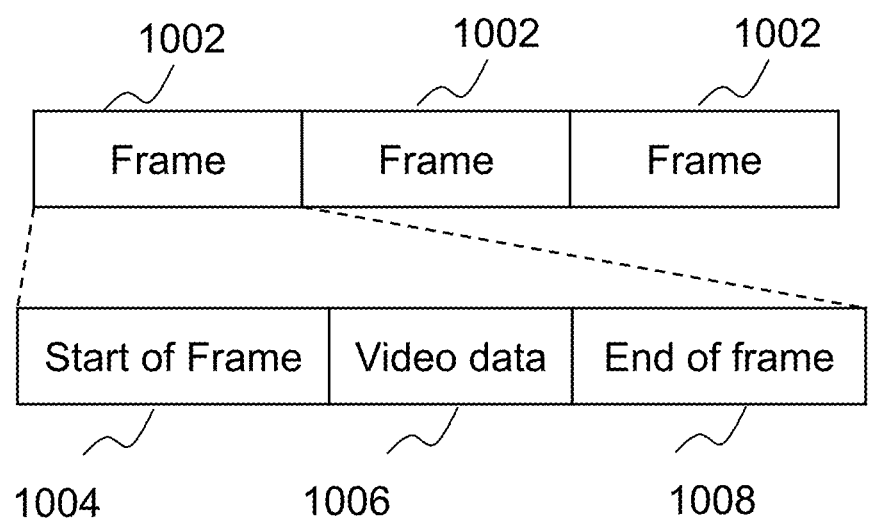
FIG. 10 is a schematic diagram illustrating an exemplary stream video file according to some embodiments of the present disclosure.

FIG. 10 is a schematic diagram illustrating an exemplary stream video file according to some embodiments of the present disclosure. The stream video file may include a plurality of frames 1002. Frame 1002 may include a start of frame (SOF) 1004, video data 1006, and an end of the frame (EOF) 1008. In some embodiments, SOF 1004 may include a standard SOF of 24 bytes and an extended SOF of variable data length. The data length of video data 1006 may be variable, and data length of EOF 1008 may be 8 bytes. A stream video file may include a plurality of frames, and in the frame, the SOF may be followed by the video data. Video file analysis unit 402 may determine a frame by identifying the location of SOF. On the other hand, a non-stream video file may include a video header, a frame list, and video data. Video file analysis unit 402 may determine the frame list by identifying the video header and may determine the video data according to the frame list. In some embodiments, the non-stream file may not be segmented arbitrarily. In some embodiments, video file analysis unit 402 may transcode the non-stream video file to a stream video file before segmenting.

Figure 11:
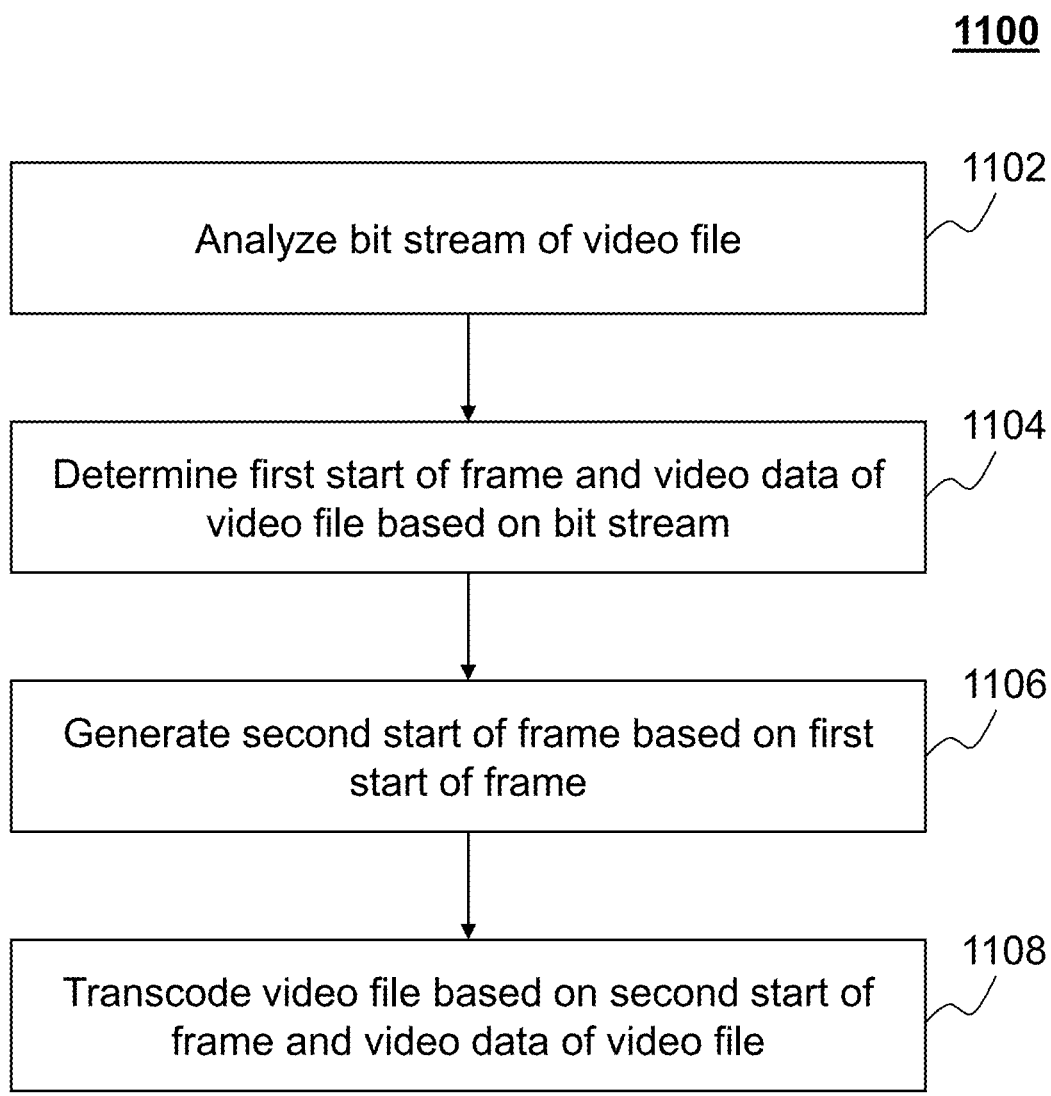
FIG. 11 is a flowchart illustrating an exemplary process for transcoding a video file according to some embodiments of the present disclosure.

Back to FIG. 9, in some embodiments, step 902 of process 900 may be performed based on an exemplary process 1100 illustrated in FIG. 11 for transcoding the video file. In 1102, computing device 120 may analyze bit stream of the video file. In some embodiments, computing device 120 may analyze video header and the frame list. Computing device 120 may further obtain the video data of the video file.

In 1104, computing device 120 may determine a first SOF and video data based on the bit stream. As used herein, the first SOF refers to a SOF of a frame in the non-stream video file. Video file analysis unit 402 may determine the first SOF based on the frame list of the non-stream video file.

In 1106, computing device 120 may generate a second SOF based on the first SOF. As used herein, the second SOF refers to a SOF of a frame of a stream video. In some embodiments, the second SOF may correspond to the first SOF.

In 1108, computing device 120 may transcode the video file based on the second SOF and the video data of the video file. In some embodiments, computing device 120 may insert the video data after the second SOF. In some embodiments, video file analysis unit 402 may repeat steps 1102, 1104, and 1106 until all the frames in the video file are transcoded.

Figure 12:
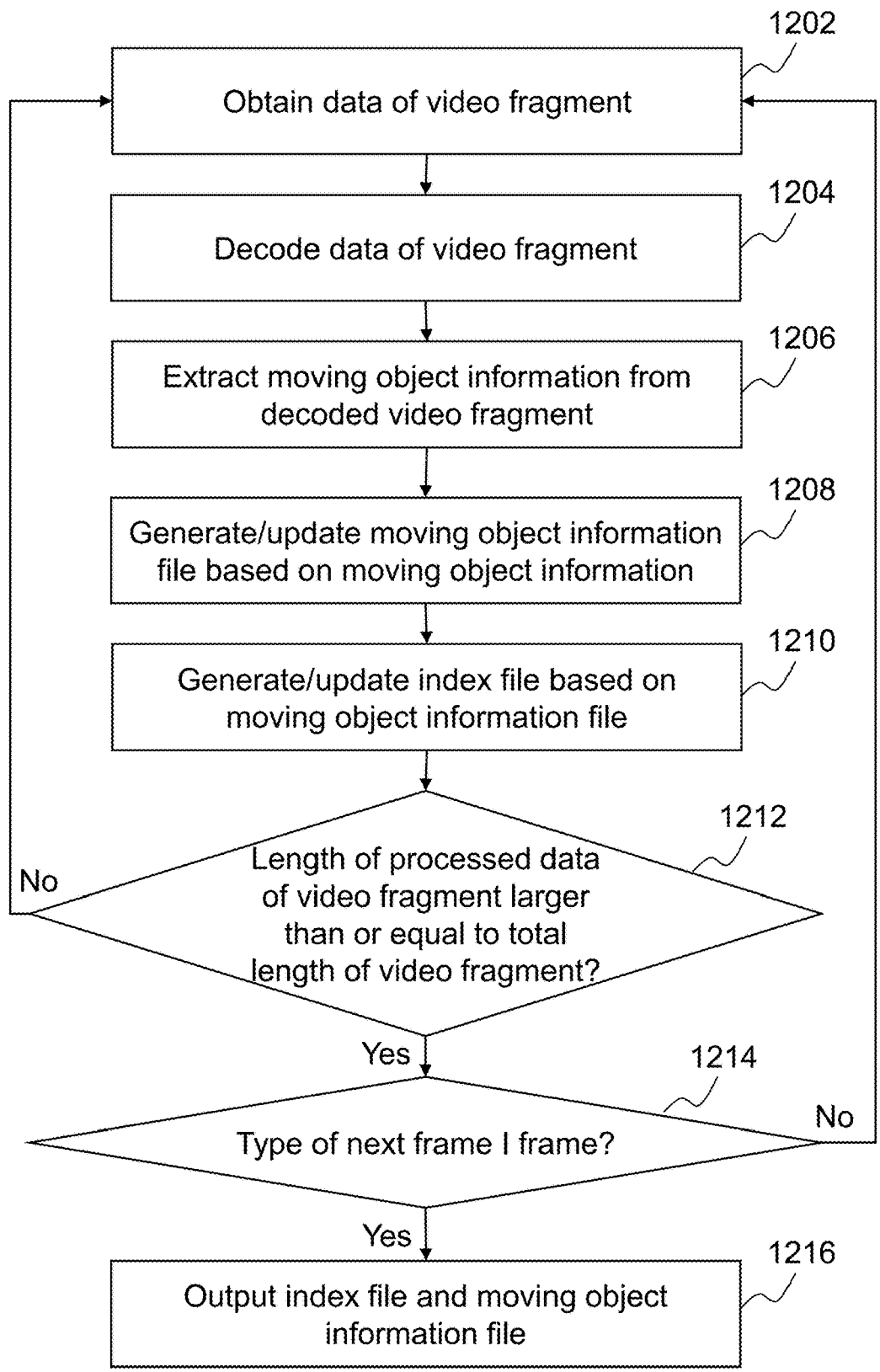
FIG. 12 is a flowchart illustrating an exemplary process for extracting video information according to some embodiments of the present disclosure.

FIG. 12 is a flowchart illustrating an exemplary process for extracting video information according to some embodiments of the present disclosure. In some embodiments, video information extraction module 304 may distribute the video fragments to a plurality of computing nodes to be processed. In some embodiments, the distributed computing method may be implemented via a cluster computing system. In some embodiments, the cluster computing system may be Apache Spark (hereafter referred to as "SPARK"). In some embodiments, a Resilient Distributed Dataset (RDD) may be generated by SPARK based on the array of video fragments. In some embodiments, an element of the array may correspond to a partition of the RDD. In some embodiments, the moving object information extraction process may be a cyclic process.

In 1202, video information extraction module 304 may obtain data of the video fragment. In some embodiments, step 1202 may be implemented via a "collect" function of the RDD. In 1204, decoding unit 502 may decode the data of the video fragment. For example, decoding unit 502 may decompress the data of the video fragment.

In 1206, moving object information determination unit 506 may extract moving object information from the decoded video fragment. The moving object information may include a moving path sequence of the moving object, an imaging sequence of the moving object, a feature of the moving object (e.g., color, velocity, size, direction, type), or the like, or a combination thereof. In some embodiments, moving object information determination unit 506 may extract moving object information relating to one or more moving objects.

In some embodiments, before moving object information determination extraction unit 506 extracts the moving object information, moving object detection identification unit 504 may first detect one or more moving objects. In some embodiments, moving object detection unit 504 may detect the moving object(s) based on a foreground detection algorithm. The foreground detection algorithm may include temporal median filter, Gaussian model, mixture of Gaussian model, kernel density estimation, eigen background, etc.

In 1208, moving object information determination unit 506 may generate a moving object information file (or update a moving object information file) based on the moving object information. In some embodiments, the moving object information file may store a moving path sequence of the moving object, an imaging sequence of the moving object, a feature of the moving object, etc. In some embodiments, moving object information determination unit 506 may generate a moving object information file for one moving object. In some embodiments, moving object information determination unit 506 may generate a plurality of moving object information files for one moving object. In some embodiments, moving object information determination unit 506 may generate a moving object information file for a plurality of moving objects.

In 1210, video information extraction module 304 may generate an index file (or update an index file) based on the moving object information file. In some embodiments, the index file may record summary information of the moving objects detected in the video fragment. In some embodiments, the summary information may include the number of the moving objects, locations of the moving object information files, etc. In some embodiments, video information extraction module 304 may generate a corresponding index file for one video fragment. In some embodiments, video information extraction module 304 may generate a plurality of index files for one video fragment. In some embodiments, video information extraction module 304 may generate one index file for a plurality of video fragments.

In some embodiments, video information extraction module 304 may process the video fragment frame by frame. For example, video information extraction module 304 may analyze a first frame of the video fragment and generate a moving object information file and an index file. Video information extraction module 304 may then analyze a second frame of the video fragment, update the moving object information file and the index file, and so forth. As another example, video information extraction module 304 may analyze a first frame of the video fragment, save the moving object information extracted from the first frame to a buffer, analyze a second frame of the video fragment, cache the moving object information extracted from the second frame, . . . , analyze an nth frame, and so forth. Video information extraction module 304 may generate a moving object information file and an index file relating to the moving object information extracted from the first frame, the second frame, the third frame, . . . , and the nth frame. Video information extraction module 304 may also analyze one or more frames of the video fragment and update the moving object information file and the index file.

In 1212, video information extraction module 304 may determine whether length of the processed data of the video fragment is larger than or equal to the total length of the video fragment. If so, the process may proceed to step 1214 to determine whether type of next frame is I frame. If not, the process may return back to step 1202, video information extraction module 304 may continue process next frame, and during the processing of the next frame, video information extraction module 304 may update the moving object information file and the index file (e.g., by performing steps 1202 through 1212).

In 1214, video information extraction module 304 may determine whether type of next frame is I frame. If so, video information extraction module 304 may, in 1216, output the index file and the moving object information file. If not, the process may return back to step 1202, video information extraction module 304 may continue process next frame, and during the processing of the next frame, video information extraction module 304 may update the moving object information file and the index file (e.g., by performing steps 1202 through 1214).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, step 1204 may be optional. As another example, step 1210 may be performed after step 1214, i.e., video information extraction module 304 may generate the index file after all the frames are processed.

Figure 13:
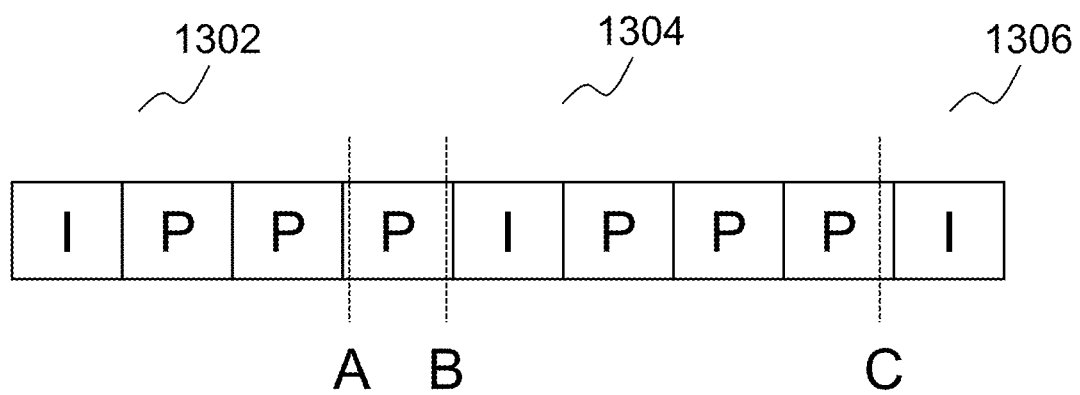
FIG. 13 is a schematic diagram illustrating exemplary video fragments according to some embodiments of the present disclosure.

FIG. 13 is a schematic diagram illustrating exemplary video fragments according to some embodiments of the present disclosure. In some embodiments, video segmentation module 302 may segment a video file into three video fragments including a first video fragment 1302, a second video fragment 1304, and a third video fragment 1306 by line A and line C according to the size of the video file.

Referring to FIG. 12, during processing first video fragment 1302, video information extraction module 304 may, at 1212, determine whether length of processed data of first video fragment 1302 is larger than or equal to the total length of first video fragment 1302. When the process approaches to line A, video information extraction module 304 may determine that the length of the processed data is equal to the total length of first video fragment 1302, and video information extraction module 304 may further determine whether next frame is I frame. As illustrated, the next frame is P frame, therefore the process will continue until the next frame is I frame (illustrated as line B). Similarly for second video fragment 1304, when the process approaches to line C, video information extraction module 304 determines that the length of the processed data is equal to the total length of second video fragment 1304, then video information extraction module 304 may further determine whether the next frame is I frame. The next frame is I frame, and the process may terminate.

It should be noted that for second video fragment 1304, since the first frame is P frame, video information extraction module 304 may abandon the P frame and process second video fragment 1304 form the next I frame. Therefore for first video fragment 1302 and second video fragment 1304, video information extraction module 304 may not process repeating frames (e.g., the P frame in second video fragment 1304 but processed during the processing of first video fragment 1302).

Figure 14:
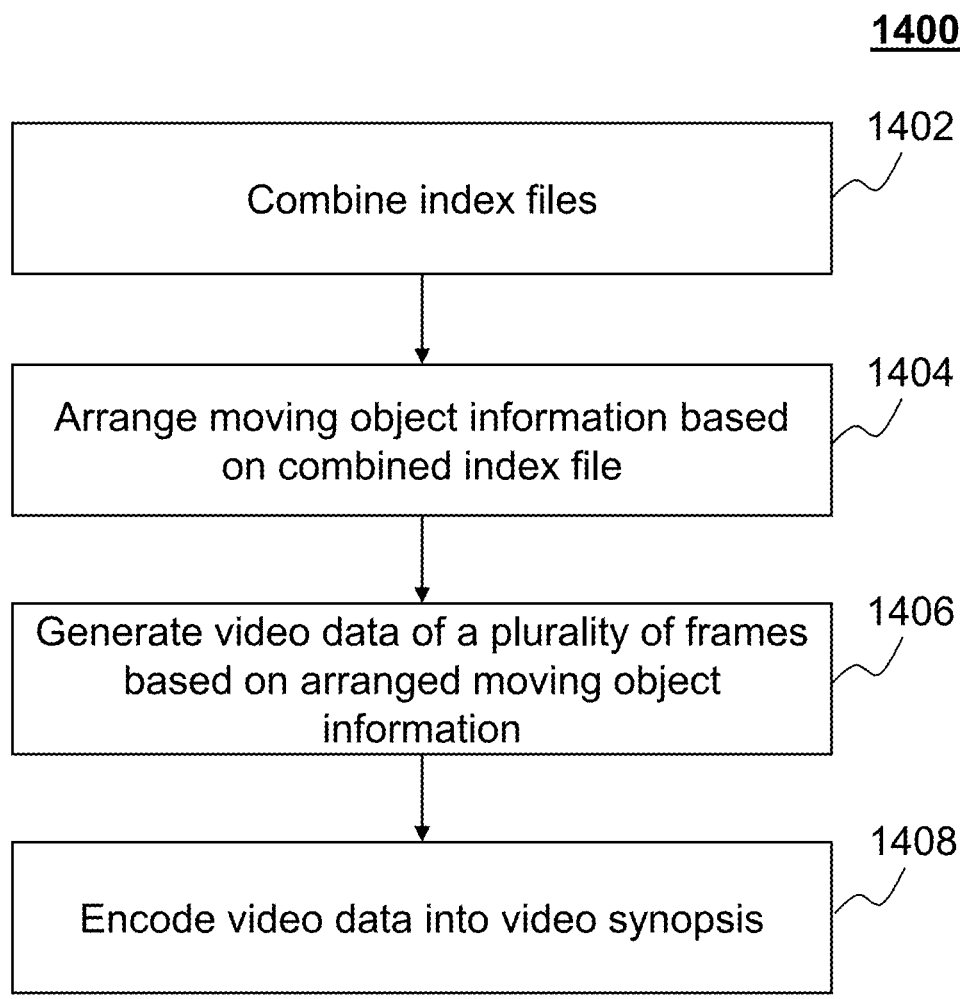
FIG. 14 is a flowchart illustrating an exemplary process for generating a video synopsis according to some embodiments of the present disclosure.

Back to FIG. 6 again, in some embodiments, step 610 of process 600 may be performed based on an exemplary process 1400 illustrated in FIG. 14 for generating a video synopsis. In 1402, video combination module 306 may combine the index files. Video information extraction module 304 may generate a plurality of index files for the plurality of video fragments. In some embodiments, video combination module 306 may combine the plurality of index files as one combined index file. In some embodiments, video combination module 306 may combine the index files in a form of groups. For example, video combination module 306 may group the index files as multiple groups and generate multiple combined index files based on the groups of index files. For illustration purposes, here takes one combined index as an example in FIG. 14, but it does not intend to limit the scope of the present disclosure.

In 1404, video synopsis generation module 308 may arrange the moving object information based on the combined index file. In some embodiments, video synopsis generation module 308 may arrange the moving object information according to a certain arrangement rule. As used herein, the arrangement rule is a rule under which the moving objects are so arranged that they do not overlap with each other and the time duration of the video synopsis may be as short as possible. In some embodiments, video synopsis generation module 308 may select a background image for the video synopsis. For example, video synopsis generation module 308 may select the background image of the first video fragment as the background image of the video synopsis.

In 1406, video synopsis generation module 308 may generate video data of a plurality of frames for the video synopsis based on the arranged moving object information. For example, video synopsis generation module 308 may generate a frame of YUK format. In 1408, video synopsis generation module 308 may encode the video data and generate the video synopsis based on the encoded data. In some embodiments, video synopsis generation module 308 may repeat steps 1406-1408 until all the imaging sequences of the moving object are processed.

In some embodiments, if the time duration of the video file is relatively long, for example, 24 hours, background images of some of the video fragments may be an image relating to daytime, and otherwise background images of some of the video fragments may be an image relating to night time. If video synopsis generation module 308 selects a background image relating to daytime as the background image of the video synopsis, the display effect of the moving object(s) that occur during the night time may be poor. Therefore, in some embodiments, video synopsis generation module 308 may generate the video synopsis by grouping the video fragments. For example, for a video fragment with a time duration of 3 minutes, video synopsis generation module 308 may select 5 video fragments as a group and select a background image for the 5 video fragments, and select another background image for next 5 video fragments, and so forth. Accordingly, the time duration of the video synopsis may be relatively long, but the display effect may be good.

Figure 15:
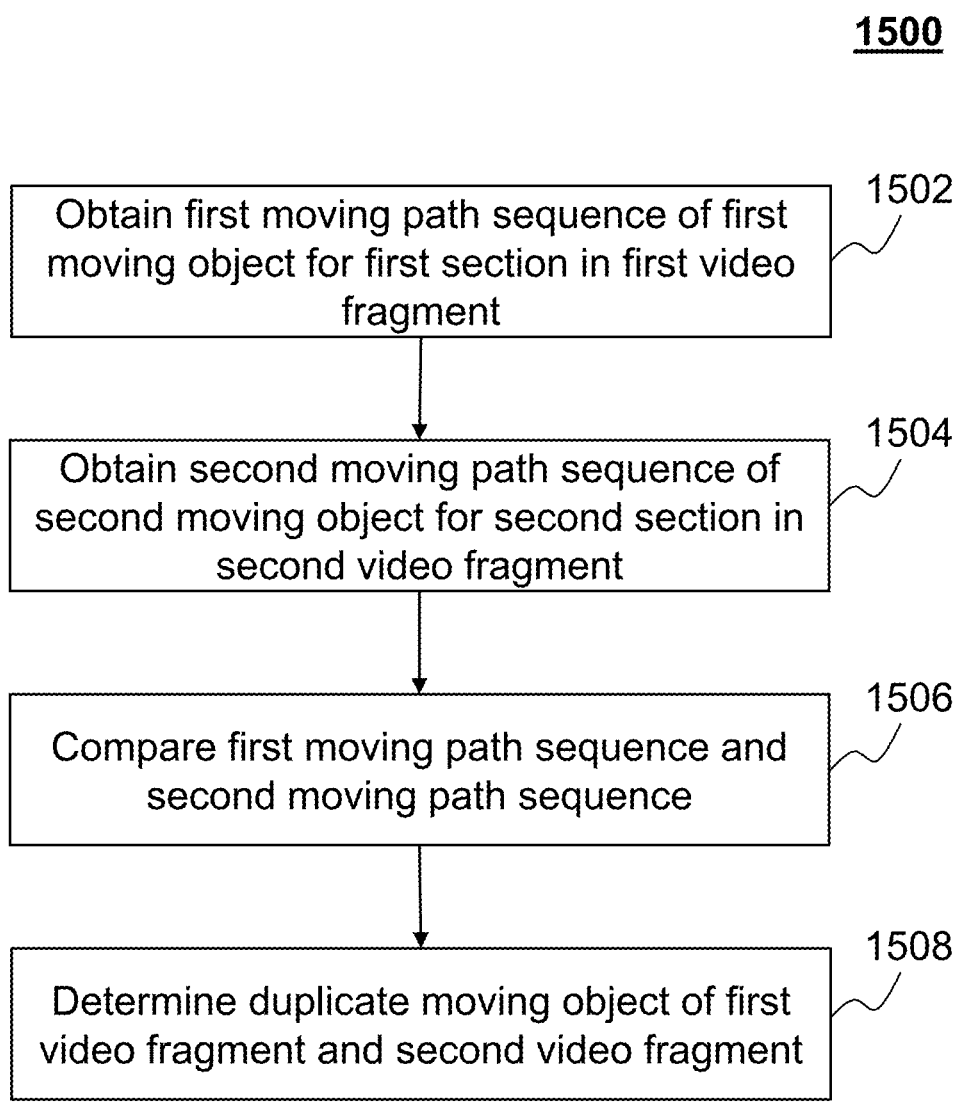
FIG. 15 is a flowchart illustrating an exemplary process for determining a duplicate moving object in video fragments according to some embodiments of the present disclosure.

FIG. 15 is a flowchart illustrating an exemplary process for determining a duplicate moving object between the video fragments according to some embodiments of the present disclosure. In some situations, a moving object may be cut off during the segmentation of the video file, causing a portion of the moving object to appear in one video fragment and another portion of the moving object to appear in another video fragment or causing a same moving object (e.g., a vehicle) to appear in two or more adjacent video fragments. If so, the moving object may occur more than once in the video synopsis. In order to avoid a duplicate moving object, computing device 120 may determine a potential duplicate moving object between two adjacent video fragments and remove the duplicate moving object. In some embodiments, the duplicate moving object may be determined during the segmentation of the video file. In some embodiments, the duplicate moving object may be determined during the combining of the index files. In some embodiments, the duplicate moving object may be determined during the generation of the video synopsis. The duplicate moving object determination process may be implemented by video segmentation module 302, video combination module 306, or video synopsis generation module 308.

In 1502, computing device 120 may select a first section at an end of a first video fragment, and reconstruct the background for the first section. As used herein, a background reconstruction may refer to an operation by which a moving object in the video fragment may be extracted, for example, a moving path sequence of the moving object may be determined. A first background image and a first moving path sequence of a first moving object may be obtained from the first section by the background reconstruction.

In 1504, computing device 120 may select a second section from a start of a second video fragment and reconstruct the background for the second section. A second background image and a second moving path sequence of a second moving object may be obtained. In some embodiments, the first video fragment and the second video fragment may include an overlapping part (e.g., N GOPs (group of pictures)); that is, the first section and the second section may overlap with each other.

In 1506, if the first background image is the same with the second background image, computing device 120 may compare the first moving path sequence and the second moving path sequence. In 1508, if the coordinates of the first moving object in the first moving path sequence and the coordinates of the second moving object in the second moving path sequence are continuous, computing device 120 may determine that the first moving object and the second moving object may be a same moving object. After the duplicate moving object is identified, computing device 120 may remove the duplicate moving object from the first video fragment or the second video fragment.

In some embodiments, in 1502 and 1504, a first imaging sequence of the first moving object and a second imaging sequence of the second moving object may be obtained respectively. In this situation, in 1506, computing device 120 may compare the first imaging sequence and the second imaging sequence. If the first imaging sequence is similar with the second imaging sequence, computing device 120 may determine a duplicate moving object of the first video fragment and the second video fragment.

EXAMPLES

The examples are provided for illustrated purposes and not intended to limit the scope of the present disclosure.

Example 1

Figure 16:
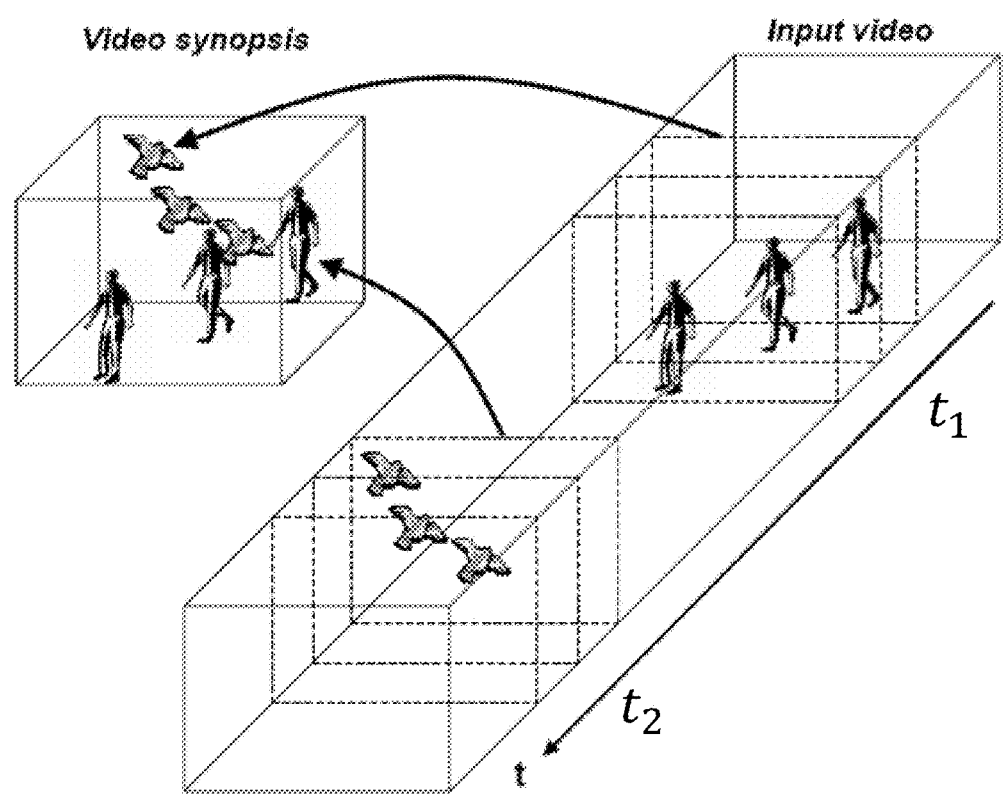
FIG. 16 is a schematic diagram illustrating an exemplary video synopsis.

FIG. 16 is a schematic diagram illustrating an exemplary video synopsis according to some embodiments of the present disclosure. As illustrated, an input video includes a plurality of moving objects. The plurality of moving objects occur in different time points in the input video, for example, a moving person occurs near time point $t_1$, a moving bird occurs near time point $t_2$. In the video synopsis generated according to the input video, the moving person and the moving bird occur near a same time point.

Example 2

FIG. 17-A illustrates a plurality of continuous video frames extracted from a video file, while FIG. 17-B illustrates a background image determined according to the plurality of continuous video frames by a foreground detection algorithm.

Example 3

FIG. 18-A illustrates an image extracted from a video file. FIG. 18-B illustrates a background image determined by a foreground detection algorithm. In some embodiments, video information extraction module 304 may compare the image illustrated in FIG. 18-A with the background image illustrated in FIG. 18-B. For example, video information extraction module 304 may further determine difference pixels between the two images and determine a plurality of regions of a plurality of moving objects by connecting the difference pixels. Merely by way of example, in FIG. 18-C, the irregular shapes represent the regions of the moving objects that are determined according to the result of comparison of the two images shown in FIGS. 18-A and 18-B. In some embodiments, video information extraction module 304 may further extract other images from the video file, compare these images with the background image, and determine difference pixels. Video information extraction module 304 may cutout the irregular shapes corresponding to the difference pixels and determine a plurality of imaging sequences of the plurality of moving objects. Video information extraction module 304 may further determine a plurality of moving path sequences of the plurality of objects based on the difference pixels.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

We claim:

1. A method for generating a video synopsis comprising:
   segmenting a video file into a plurality of video fragments;
   extracting moving object information from the plurality of video fragments based on a distributed computing method;
   determining a plurality of index files corresponding to the plurality of video fragments based on the moving object information;
   combining the plurality of index files; and
   generating a video synopsis by:
      arranging the moving object information based on the combined index file;
      generating video data of a plurality of frames based on the arranged moving object information; and
      encoding the video data into the video synopsis.

2. The method of claim 1, wherein segmenting the video file into a plurality of video fragments includes:
   analyzing a parameter of the video file;
   determining a computing power;
   determining a parameter of a video segment based on the parameter of video file and the computing power; and
   generating the plurality of video fragments based on the parameter of the video file and the parameter of the video segment.

3. The method of claim 2, wherein the parameter of the video file includes a type of a frame, a length of the frame, a location of the frame, a number count of frames in the video file, a frame index of the video file, or a size of the video file.

4. The method of claim 2, wherein generating the plurality of video fragments based on the parameter of the video file and the parameter of the video segment includes:
   determining a first frame number;
   determining a first computing power;
   determining a second frame number based on the parameter of the video file and the first computing power;
   determining a third frame number based on the first frame number and the second frame number; and
   generating the plurality of video fragments based on the parameter of the video file and the third frame number.

5. The method of claim 2, wherein generating the plurality of video fragments based on the parameter of the video file and the parameter of the video segment includes:
   obtaining a size of the video file;
   obtaining a predetermined size of the video segment;
   determining a first segment number based on the size of the video file and the predetermined size of the video segment;
   determining a second computing power;
   determining a second segment number based on the first segment number and the second computing power;
   determining a size of the video segment based on the size of the video file and the second segment number; and
   generating the plurality of video fragments based on the size of the video segment and the second segment number.

6. The method of claim 1, further including transcoding the video file, wherein transcoding the video file includes:
   analyzing bit stream of the video file;
   determining a first start of frame (SOF) and video data based on the bit stream;
   generating a second SOF based on the first SOF; and
   generating a transcoded video file based on the second SOF and the video data.

7. The method of claim 1, wherein extracting the moving object information from the plurality of video fragments based on a distributed computing method includes:
   for each of the plurality of video fragments,
      decoding data of the video fragment;
      detecting a moving object based on the decoded video fragment; and
      extracting the moving object information based on the moving object from the decoded video fragment.

8. The method of claim 1, wherein determining a plurality of index files corresponding to the plurality of video fragments based on the moving object information includes:
   for each of the plurality of video fragments,
      generating a moving object information file based on the moving object information; and
      generating a corresponding index file based on the moving object information file.

9. A method for generating a video synopsis comprising:
   segmenting a video file into a plurality of video fragments;
   extracting moving object information from the plurality of video fragments based on a distributed computing method;
   obtaining a first moving path sequence for a first section in a first video fragment based on the moving object information;
   obtaining a second moving path sequence for a second section in a second video fragment based on the moving object information;
   comparing the first moving path sequence and the second moving path sequence;
   determining a duplicate moving object of the first video fragment and the second video fragment
   removing the duplicate moving object from the first video fragment or the second video fragment;
   determining a plurality of index files corresponding to the plurality of video fragments based on the moving object information;
   combining the plurality of index files; and
   generating a video synopsis based on the moving object information and the combined index file.

10. A system comprising:
    memory storing instructions; and
    at least one processor that executes the instructions to perform operations comprising:
       segmenting a video file into a plurality of video fragments;
       extracting moving object information from the plurality of video fragments based on a distributed computing method;
       determining a plurality of index files corresponding to the plurality of video fragments based on the moving object information;
       combining the plurality of index files; and
       generating a video synopsis by:
          arranging the moving object information based on the combined index file;
          generating video data of a plurality of frames based on the arranged moving object information; and
          encoding the video data into the video synopsis.

11. The system of claim 10, wherein segmenting the video file into a plurality of video fragments includes:
    analyzing a parameter of the video file;
    determining a computing power;
    determining a parameter of a video segment based on the parameter of video file and the computer power; and
    generating the plurality of video fragments based on the parameter of the video file and the parameter of the video segment.

12. The system of claim 11, wherein the parameter of the video file includes a type of a frame, a length of the frame, a location of the frame, a number count of frames in the video file, a frame index of the video file, or a size of the video file.

13. The system of claim 11, wherein generating the plurality of video fragments based on the parameter of the video file and the parameter of the video segment includes:
    determining a first frame number;
    determining a computing power;
    determining a second frame number based on the parameter of the video file and the computing power;
    determining a third frame number based on the first frame number and the second frame number; and
    generating the plurality of video fragments based on the parameter of the video file and the third frame number.

14. The system of claim 11, wherein generating the plurality of video fragments based on the parameter of the video file and the parameter of the video segment includes:
    obtaining a size of the video file;
    obtaining a predetermined size of the video segment;
    determining a first segment number based on the size of the video file and the predetermined size of the video segment;
    determining a computing power;
    determining a second segment number based on the first segment number and the computing power;

determining a size of the video segment based on the size of the video file and the second segment number; and generating the plurality of video fragments based on the size of the video segment and the second segment number.

15. The system of claim 10, the operations further including transcoding the video file, wherein transcoding the video file includes:

analyzing bit stream of the video file;

determining a first start of frame (SOF) and video data based on the bit stream;

generating a second SOF based on the first SOF; and generating a transcoded video file based on the second SOF and the video data.

16. The system of claim 10, wherein extracting the moving object information from the plurality of video fragments based on a distributed computing method includes:

for each of the plurality of video fragments,
decoding data of the video fragment;
detecting a moving object based on the decoded video fragment; and
extracting the moving object information based on the moving object from the decoded video fragment.

17. The system of claim 10, wherein determining a plurality of index files corresponding to the plurality of video fragments based on the moving object information includes:

for each of the plurality of video fragments,
generating a moving object information file based on the moving object information; and
generating a corresponding index file based on the moving object information file.

18. The system of claim 10, the operations further including:

obtaining a first moving path sequence for a first section in a first video fragment based on the moving object information;

obtaining a second moving path sequence for a second section in a second video fragment based on the moving object information;

comparing the first moving path sequence and the second moving path sequence;

determining a duplicate moving object of the first video fragment and the second video fragment;

removing the duplicate moving object from the first video fragment or the second video fragment;

determining a plurality of index files corresponding to the plurality of video fragments based on the moving object information;

combining the plurality of index files; and generating a video synopsis based on the moving object information and the combined index file.

* * * * *